United States Patent
Bartone

(10) Patent No.: US 9,851,429 B2
(45) Date of Patent: Dec. 26, 2017

(54) TERRESTRIAL POSITION AND TIMING SYSTEM

(71) Applicant: Ohio University, Athens, OH (US)

(72) Inventor: Chris G. Bartone, Athens, OH (US)

(73) Assignee: Ohio University, Athens, OH (US)

( * ) Notice: Subject to any disclaimer, the term of this patent is extended or adjusted under 35 U.S.C. 154(b) by 213 days.

(21) Appl. No.: 15/223,875

(22) Filed: Jul. 29, 2016

(65) Prior Publication Data

US 2017/0139030 A1    May 18, 2017

Related U.S. Application Data

(62) Division of application No. 13/832,749, filed on Mar. 15, 2013, now Pat. No. 9,429,639.

(60) Provisional application No. 61/640,850, filed on May 1, 2012.

(51) Int. Cl.
| | |
|---|---|
| *G01S 1/08* | (2006.01) |
| *G01S 1/50* | (2006.01) |
| *G01S 1/04* | (2006.01) |
| *G01S 5/02* | (2010.01) |

(52) U.S. Cl.
CPC .............. *G01S 1/045* (2013.01); *G01S 1/042* (2013.01); *G01S 1/50* (2013.01); *G01S 5/0284* (2013.01)

(58) Field of Classification Search
CPC .................................. G01S 1/50; G01S 5/0009
USPC ............... 342/113, 145, 146, 158, 386, 404; 370/342, 441
See application file for complete search history.

(56) References Cited

U.S. PATENT DOCUMENTS

| | | |
|---|---|---|
| 5,329,547 A | 7/1994 | Ling |
| 6,850,734 B1 | 2/2005 | Bruno et al. |
| 2015/0295625 A1 | 10/2015 | Murakami et al. |

FOREIGN PATENT DOCUMENTS

GB    2081548 A    2/1982

OTHER PUBLICATIONS

Bartone, C., "Advanced Pseudolite for Dual-Use Precision Approach Applications", Institute of Navigation—Global Positioning System 1996, Sep. 17-20, 1996, pp. 791-797.
Bartone, C., Van Graas, F., "Airport Pseudolite for Precision Approach Applications", Institute of Navigation—Global Positioning System 1997, Sep. 16-19, 1997, pp. 1841-1850.

(Continued)

*Primary Examiner* — Dao Phan
(74) *Attorney, Agent, or Firm* — Standley Law Group LLP

(57) ABSTRACT

A terrestrial positioning and timing system (TPTS) comprising a ground segment and user segment is disclosed that is comprised of a spread-spectrum based range and bearing reference signal, with respect to a reference time, transmitted by an antenna over a broad region of space; and a spread-spectrum based bearing variable signal with bearing specific modulation referenced to a reference time, transmitted using a scanning antenna over a spatial region of space that is more narrow than the spread-spectrum based range and bearing reference signal transmission spatial area. Various embodiments enable the TPTS station and user to support various position, velocity or time services. Most notably, an embodiment with a single TPTS station, active interrogation/transponder reply, and data delivery subsystem can provide a position, velocity, and time solution for the user. Additional embodiments disclosed provide varying levels of user solutions to include bearing, position, velocity, or time.

37 Claims, 9 Drawing Sheets

(56) References Cited

OTHER PUBLICATIONS

Bartone, C.G., Ranging Airport Pseudolite for Local Area Augmentation Using the Global Positioning System, Ph.D. Dissertation, Ohio University, Jun. 1998.

Bartone, C., "Multipath Consideration for Ground Based Ranging Sources", Institute of Navigation—Global Positioning System 1999, Sep. 14-17, 1999, pp. 1491-1498.

Bartone, C., Van Graas, F., "Airport Pseudolite for Local Area Augmentation", Institute of Electrical and Electronics Engineers, Transactions on Aerospace and Electronics Systems, vol. 36, No. 1, Jan. 2000, pp. 278-286, ISSN 0018-9251.

Bartone, C., Kiran, S., "Development of a Wideband Airport Pseudolite for GPS Augmentation", Institute of Navigation National Technical Meeting 2000, Jan. 25-28, 2000, pp. 50-57.

Bartone, C., Kiran, S., "Flight Test Results of an Integrated Wideband Airport Pseudolite for the Local Area Augmentation System", Institute of Navigation—Global Positioning System 2000, Sep. 19-22, 2000, pp. 1172-1179.

Kiran, S., Bartone, C., "Flight-Test Results of an Integrated Wideband-Only Airport Pseudolite for the Category II/III Local Area Augmentation System", Navigation Journal of The, Institute of Navigation, vol. 48, No. 1, Spring 2001, pp. 35-48.

Dickman, J., Bartone, C., "Antenna Techniques to Optimize Pseudorange Measurements for Ground Based Ranging Sources", Institute of Navigation—Annual Meeting 2001, Jun. 11-13, 2001, pp. 263-274.

Kiran, S., Bartone, C., "Flight-Test Results of an Integrated Wideband-Only Airport Pseudolite for the Category II/III Local Area Augmentation System", Institute of Electrical and Electronics Engineers, Position Location and Navigation Symposium, Palm Springs, CA, Apr. 16-18, 2002, pp. 204-211, IEEE Catalog No. 02CH37284, ISBM: 0-7803-7251-4.

Dickman, J., Bartone, C., Zhang, Y., Thornberg, B., "Characterization and Performance of a Prototype Wideband Airport Pseudolite Multipath Limiting Antenna for the Local Area Augmentation System", Institute of Navigation, National Technical Meeting, Jan. 22-24, 2003, pp. 783-793.

Kiran, S., Bartone, C., "A Viable Airport Pseudolite Architecture for LAAS", Institute of Navigation—Global Positioning System Conference 2003, Sep. 9-12, 2003, pp. 2326-2336.

Kiran, S., A Wideband Airport Pseudolite Architecture for the Local Area Augmentation System, Ph.D. Dissertation, Ohio University, Nov. 2003.

Thornberg, B., Thornberg, D., Dibenedetto, M., Braasch, M., Van Graas, F., Bartone, C., "The LAAS Integrated Multipath Limiting Antenna (IMLA)", Navigation Journal, of The Institute of Navigation, vol. 50, No. 2, Summer 2003, pp. 117-130.

Kiran, S., Bartone, C., "Flight-Test Results of an Integrated Wideband-Only Airport Pseudolite for the Category II/III Local Area Augmentation System", Institute of Electrical and Electronics Engineers, Transactions on Aerospace and Electronics Systems, vol. 40, No. 1, Jan. 2004, pp. 734-741, ISSN 0018-9251.

Kiran, S., Bartone, C., "Verification and Mitigation of the Power-Induced Measurement Errors for Airport Pseudolites in LAAS", co-author: Kiran, S., GPS Solutions Journal, Springer-Verlag, vol. 7, No. 4, Mar. 2004, pp. 241-252, DOI 10.1007/s10291-003-0076-0.

RTCA Inc., Minimum Operational Performance Standards for Airborne Distance Measuring Equipment (DME) Operating within the Radio Frequency Range of 960-1215 MHz, RTCA SC-149, DO-189, Sep. 20, 1985.

RTCA Inc., Minimum Operational Performance Standards for Airborne Area Navigation Equipment Using a Single Collocated VOR/DME Sensor Input, RTCA SC-137, DO-180A, May 24, 1990.

Global Positioning System Wing (GPSW) Systems Engineering & Integration Interface Specification, Navstar GPS Space Segment/Navigation User Interfaces, IS-GPS-200E, Jun. 8, 2010, IS-GPS-200, Revision E.

DB Systems 2011 Website, http://www.dbsant.com/DME.php, data visited Nov. 12, 2011.

Stutzman, W.L., Thiel, G.A., "Antenna Theory and Design", 2nd Edition, John Wiley & Sons, Inc., ISBN: 0-471-02590-9, Apr. 21, 1981.

Global Positioning System Wing (GPSW) Systems Engineering & Integration Interface Specification, Navstar GPS Space Segment / User Segment L5 Interfaces, IS-GPS-705A, Jun. 8, 2010, IS-GPS-705, Revision A.

Global Positioning System Wing (GPSW) Systems Engineering & Integration Interface Specification, Navstar GPS Space Segment/ User Segment L1C Interface, IS-GPS-800A, Jun. 8, 2010, IS-GPS-800, Revision A.

Haykin, S., "Communication Systems", 4th Edition, ISBN: 0-471-17869-1, John-Wiley & Sons, Inc., pp. 107-111, May 15, 2000.

TERRESTRIAL POSITION AND TIMING SYSTEM

PRIORITY

This application is a divisional and continuation of U.S. application Ser. No. 13/832,749, filed Mar. 15, 2013, which claims priority to U.S. Provisional App. No. 61/640,850, filed May 1, 2012, each of which is incorporated by reference in its entirety.

BACKGROUND

Exemplary embodiments of the present invention relate generally to a terrestrial positioning and timing system ("TPTS" or "System") that draws upon the heritage of current terrestrial distance, bearing, and positioning systems used in aviation, while incorporating new concepts for signal structure and implementation techniques to provide a terrestrial user position, navigation, and time ("PNT") service. The TPTS also draws upon the concepts and techniques of terrestrial based differentially corrected pseudo satellites ("pseudolites"), using a modified code division multiple access ("CDMA") Global Positioning Systems ("GPS") signal format.

The TPTS may be considered an alternative PNT service, for use when the GPS is not available. While the GPS is a popular satellite-based positioning system, other satellite-based positioning systems exist. The more general term for satellite-based positioning system is a Global Navigation Satellite System (GNSS). Other satellite-based position such as the Russian GLObal NAvigation Satellite System (GLONASS), the European Galileo, Chinese BeiDou are other. The TPTS may be considered as an alternative PNT service, for use when these GNSSs are not available. While GPS provides good position accuracy, continuity, availability, and integrity for some aviation applications, its reliability for certain aviation services have come into question due to potential unfavorable consequences if GPS is not available. Distance, bearing, positioning, and timing services are also available from the national airspace system ("NAS"). Currently, each of these services has deficiencies in providing position, velocity, time ("PVT") services within the NAS relative to the levels provided by a GPS based solution.

Current Distance Measurement Equipment (DME) is based primarily on pulsed modulation and determines an estimate of range from a user to a station. One of the fundamental limitations of the DME is the pulsed format where timing, and hence range accuracy, is derived from broadcast pulse timing. The Very High Frequency (VOR) Omni-directional Range (VOR) system is based in the VHF frequency band, and despite its name, provided bearing only to a station. The VOR system requires substantial ground facilities to minimize signal error and can have siting complications to minimize multipath. The Tactical Air Navigation (TACAN) combines aspects of the DME and VOR for a ground station that is capable of producing range and bearing from a station; however, its accuracy and limitations of accuracy are a function of the limitations and accuracies of the DME and VOR systems the TACAN uses as a basis. The Joint Tactical Information Distribution System (JTIDS) implements a complex signal format that is utilized by authorized (i.e., military) users. The Long Range Navigation (Loran) Systems has been recently decommissioned for operational use by the United States Government. Operational use of Loran (e.g., Loran-C or enhanced Loran) in other parts of the Globe have limited coverage area and require specialized equipment. Experience with global navigation satellite systems such as GPS, Glonass, and Galileo show that a code-division multiple access ("CDMA") technique may provide excellent range accuracy performance because the signal bandwidth may be used for correlation of a spreading code and then integrated over time to produce good range estimation.

The need for position, velocity, or time of a mobile user is not limited to aviation applications. Just as aviation user could use the TPTS station in times when a supporting GNSS is not available, other types of users (e.g., land) can use a suitably configured TPTS station to support its position, velocity, or timing requirement.

SUMMARY OF THE INVENTION

An exemplary embodiment of a TPTS and method can be configured in various ways to overcome one or more shortcomings of the known art for a particular application. The TPTS may be comprised of a TPTS Ground Segment with one or more stations and a User Segment that may contain a plurality of TPTS users. A TPTS station may be configured in various ways to provide varying levels of service to a particular TPTS user. An exemplary embodiment of the TPTS station is fixed/ground based, however, one skilled in the art will recognize the TPTS station may be mobile for certain applications (e.g., military mobile or sea-based). Additionally, a TPTS user can be configured in various ways to implement various services provided by the TPTS. In one example, a user component of the TPTS system may be a user TPTS antenna/receiver in an airborne environment. Other embodiments of the invention may include users which are land (e.g., TPTS antenna/receiver in a mobile station) or water based. An example of the TPTS ground segment may include various TPTS stations that may be spatially separated and synchronized in time to form a TPTS System Time. At each TPTS station, there may be a TPTS transmission, monitor, and control site that may be functionally integrated and may be spatially in the same proximity or spatially diverse (i.e, not co-located). The terms TPTS station may include the TPTS transmitter and monitor antennas, and TPTS control site. All TPTS signals transmitted may be monitored and corrections may be formed at a co-located TPTS control site and encoded onto a communications link that may be a TPTS broadcast signal. The broadcast signal may be communicated within the TPTS station and broadcast to the user via a communications link. Thus, an embodiment of the TPTS is inherently a differentially corrected system. An example of the user segment may be deployed using a simple omni-directional antenna and computation circuitry electronics. A single user antenna may be used to receive TPTS signals transmitted from a TPTS station; this does not preclude multiple antennas being used to receive and process the TPTS signal. Such antenna combinations may depend upon the host platform configuration, limitations, and operational procedures. Various embodiments of the TPTS may include three primary modes for the user, with varying capabilities: 1) a passive autonomous broadcast mode, 2) an active interrogation/reply mode ("IR/XP"), and 3) a hybrid user solution mode that uses signals from the first two modes.

Example embodiments of the TPTS may utilize TPTS terrestrial transmission sources to derive range, pseudorange ("PR"), bearing, or timing information. Due to this largely planar geometry, a vertical component of the position, velocity, and time ("PVT") may be provided by a vertical estimator. This vertical estimator may be enabled by devices such as a barometric altimeter, radar altimeter, map data base, other sensors, or sensor integration systems. While a PVT solution is comprehensive, the term user solution may be used to refer to the user's position, velocity, or time solution.

A data capability may be included in the TPTS to allow various data correction and systems information to be transmitted from the TPTS stations to users (e.g., mobile or airborne users). Passive and active modes may allow for various user types, with varying capacities and costs. Using active IR/XP and a vertical estimator, an embodiment of the TPTS may provide a user PVT solution with active and passive signals from only one TPTS station. When an active IR/XP capability is utilized with a TPTS station, a user may actively interrogate and reply to a TPTS station and receive a XP reply, or a TPTS station may interrogate and reply to a TPTS user, whereby the TPTS user will provide a timely XP reply with user measurement data that is received and processed by the TPTS station. For a passive only TPTS user with a vertical estimator, an embodiment of the TPTS provides a user PVT solution from the passive only signals transmitted from two TPTS stations. Various embodiments are discussed in the detailed description.

In addition to the novel features and advantages mentioned above, other benefits will be readily apparent from the following descriptions of the drawings and various embodiments.

DETAILED DESCRIPTION OF EXEMPLARY EMBODIMENT(S)

The Terrestrial Positioning and Timing System

To suit the particular application, the TPTS may be hosted in a variety of frequency bands. For a given application, a particular embodiment may be implemented to be compatible with the frequency band for the application at hand. For example, in an aviation application, the band that may be best suited to host a TPTS is the L-Band (960-1215 MHz), which is a federally protected Aeronautical Radio Navigation Service ("ARNS") band. With the large infrastructure of DME within the 960-1215 MHz band, a TPTS could be implemented in that band or integrated with an existing DME to enhance the performance of the overall system. Integration of a TPTS within an existing DME ground based station may utilize the same DME transmission antenna, shelter, and housing. New signals may be added in addition to existing DME signal structures. Integrating the added capability of a TPTS to the DME infrastructure may provide service to legacy users and provide a good migration path for upgrade to the TPTS from existing DME.

However, for other applications, a TPTS embodiment may be implemented in other bands. For a given application, a particular embodiment may be implemented to be compatible with the frequency band for the application at hand. For example, for a cellular type application the band that may be best suited to host a TPTS would be the various cellular bands used throughout the Globe.

The signal structure of the TPTS is based on a spread spectrum modulation technique. Code Division Multiple Access (CDMA) may be implemented using pseudo-random noise ("PRN") codes to produce correlation with a TPTS receiver. TPTS PRN spreading codes provide very good accuracy performance, and may be easily implemented using existing technology.

Figure 1:
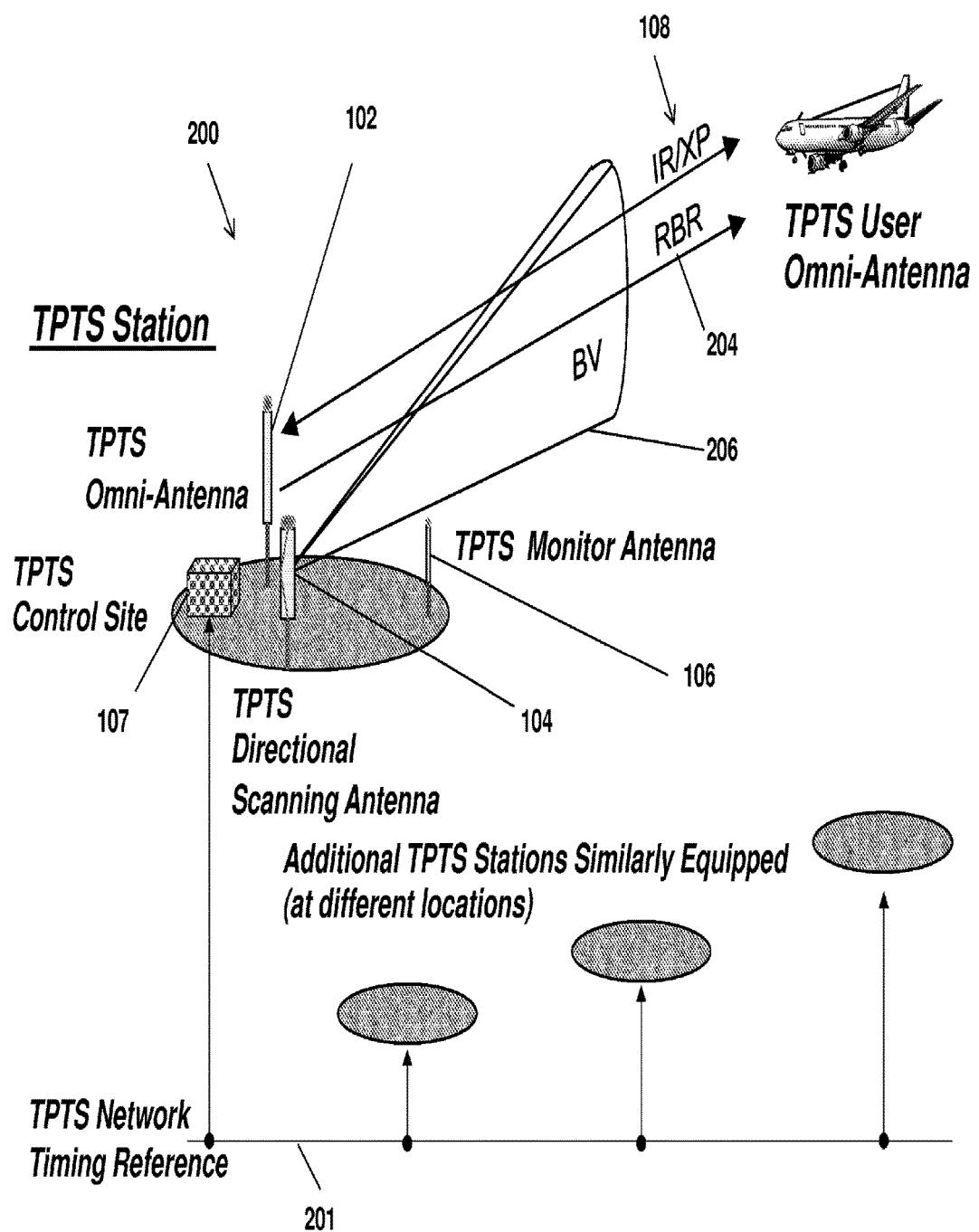
FIG. 1 is a general diagram of a various embodiment of a TPTS.

FIG. 1 is a general diagram illustrating the major components and signals for the TPTS that will be described in various embodiments. Various embodiments of the TPTS may be configured for applications in aviation, cellular telecommunications base stations, or other position, velocity, or time applications.

Referring to FIG. 1, at a TPTS station 200, TPTS transmissions may occur from two antennas: an omni-directional antenna 102 and a directional antenna, scanning in azimuth 104. While these two antennas, 102 and 104 are illustrated as two separate antennas, they may be functionally integrated into a single antenna subsystem. When operating in an autonomous broadcast mode, the TPTS station 200 may transmit two signal components: a range and bearing reference ("RBR") signal 204 that may be transmitted using the omni-directional antenna 102, and a bearing variable ("BV") signal 206 that may be transmitted using the directional antenna scanning in azimuth 104. (One skilled in the art will recognize that the BV signal 206 may be transmitted from the scanning antenna (in space), by a mechanical, electronic, or switchable type subsystem.) These autonomous (i.e., beacon like) signals may allow a user to calculate PR and bearing from an individual TPTS station 200. Signals transmitted by the TPTS antennas may be monitored by a TPTS monitor antenna 106. Monitoring information from the TPTS monitor antenna site may be passed to the TPTS control site 107 for message formatting and control of TPTS functions. TPTS network timing reference 201 may be used for time determination and to allow multiple TPTS stations to synchronously transmit signals. Multiple TPTS stations may be useful to support passive TPTS users. The TPTS network timing reference may be used for transmitter clock error corrections or to enable time determination for a user solution.

FIG. 1 also illustrates the active interrogation (IR)/reply (XP) capabilities of the TPTS that will be detailed in the embodiments that follow. Passive TPTS stations or passive TPTS users refers to users that do not have an active IR/XP capability (i.e., do not have the capability to generate an active IR and hence not able to receive and process the XP). The notation IR/XP 108 implies a particular TPTS user would be able to actively generate an IR and process the XP reply. The notation IR/XP 108 also implies that a particular TPTS station would be able to actively generate an IR and process the corresponding XP reply from a user, that may contain user measurement data, which will depend upon the particular embodiment, as described below.

Figure 2:
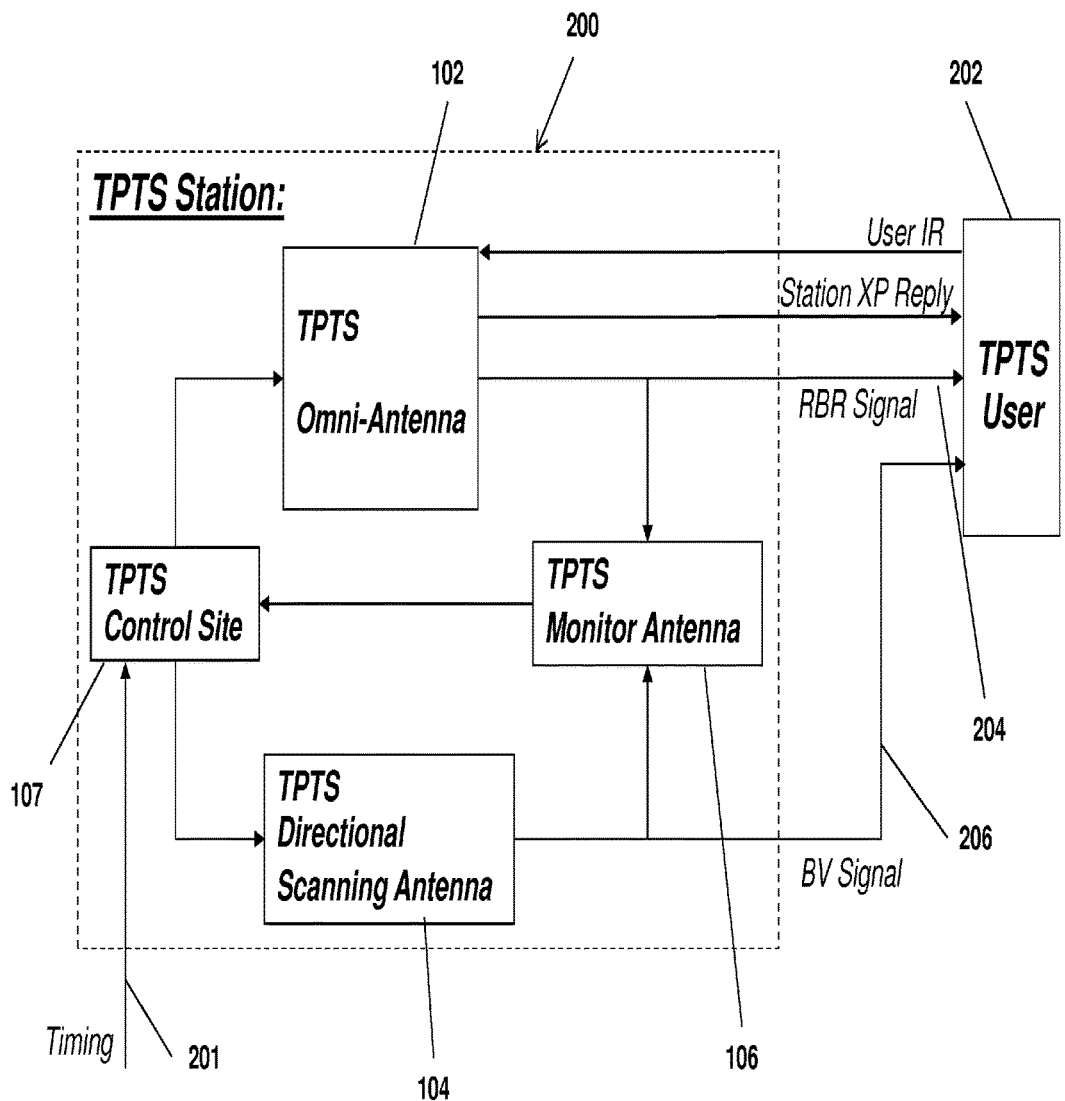
FIG. 2 is a block diagram of a first embodiment of a TPTS.

FIG. 2 is a block diagram of a first embodiment of a TPTS that illustrates a single TPTS station 200 and active TPTS user 202. FIG. 2 illustrates the active IR/XP mode of an embodiment of the TPTS whereby the user 202 may selectively interrogate TPTS stations to obtain an estimate of range to each TPTS station. For a user 202 operating in a TPTS active IR/XP with a vertical estimator, an embodiment of the TPTS may provide a hybrid user PVT solution with active and passive signals from only one TPTS station 200. The details of this first embodiment and its functional components will now be described.

TPTS Ground Control Segment

Generally, the TPTS ground control segment may comprise a plurality of TPTS stations and may also include a TPTS master control site. The TPTS master control site may be one of the TPTS stations 200. This TPTS master control site may be responsible for receiving an external timing reference from a trusted time source (e.g., United States Naval Observatory) and distributing it to each TPTS station in order to create a TPTS system time. The TPTS master control site may also be the one single point to control and send messages to each TPTS station. For a single TPTS station, as illustrated in the first embodiment in FIG. 2, the timing input 201 may be from a TPTS master site or trusted source. This central timing may allow a user to maintain a consistent time solutions as the user moves from one supporting TPTS station to another TPTS supporting station.

TPTS System Timing

An embodiment of the TPTS system may operate in an autonomous broadcast mode. When operating in this mode, the TPTS system is a "one-way" ranging system, similar to a GPS, where a transmitter clock error is measured with respect to a known clock and conveyed, via a communications link to a passive mobile user, so that the user can apply the transmitter clock error correction terms prior to the calculation of a user solution. For a passive TPTS user, this capability may be desired so that a passive TPTS user can calculate a user PVT solution using more than one TPTS station. The TPTS system time will need to be common among the various TPTS stations. Time sources which may be used to generate a TPTS system time include, but are not restricted to, terrestrial, celestial, or satellite based time references. An exemplary method to provide a TPTS system time to each TPTS station from the TPTS master control site may be by means of a two-way time transfer via satellite link or dedicated fiber optic link, as one skilled in the art would understand.

While a TPTS system time, independent from GPS system time, is desirable, GPS system time may be used in certain operational scenarios. Scenarios where the GPS system time could be used as TPTS system time may be: 1) when GPS is available to all users, 2) when GPS is available at TPTS stations, but not at a mobile user where interference may be seen, or 3) in cases where a short term GPS outage could be bridged with high accuracy time references at the TPTS stations. For a single TPTS support station, the timing input may be from a TPTS master site or trusted source. This timing input 201 may allow a user to maintain a consistent time solutions as the user moves from one supporting TPTS station to another TPTS supporting station. For a multi-TPTS station configuration supporting a passive TPTS user, a common TPTS system time will enable a time solution for the user.

TPTS Station

An exemplary TPTS station may be comprised of a TPTS transmitter site, TPTS monitor site, and TPTS control site 107 that may receive an external TPTS system time and control timing for the particular TPTS station; a TPTS transmitter site for TPTS signals may be integrated within the TPTS control site 107. For an aviation type application, the transmitter and monitor sites may be surveyed and co-located with the control site, located on airport property, and may be configured to service all runways within a predefined service volume.

TPTS Transmitter Site

The TPTS transmitter site may be integrated with an existing transmission site. If a pre-existing site has a ranging capability (e.g., DME), to add a bearing TPTS function, an additional directional scanning antenna 104 may be needed. While additional equipment is needed to implement such an antenna, a significant added capability may be provided within a complete TPTS by adding the bearing determination from a single station. This added capability may add significant benefit for users, especially in the unfortunate event of GPS non-availability. The TPTS transmitter site may be configured to include the directional scanning antenna 104 supporting transmitter and signal generation that may be housed within the TPTS control site. One skilled in the art will recognize that other configurations are possible.

TPTS Autonomous Broadcast Mode

FIG. 2 also illustrates the major component of an embodiment of the TPTS operating in an autonomous broadcast mode from the TPTS station (i.e, the broadcast signals from the TPTS station, independent from the IR/XP signals). With a supporting TPTS network, which includes TPTS network timing 201, the mobile user 202 may calculate an estimated range and bearing from the information provided in two signal components of the Autonomous Broadcast Mode using a TPTS station. The first signal being a RBR signal 204, and the second being a BV signal 206.

TPTS Autonomous Link Calculation

An example link calculation for the TPTS is discussed below and presented in Table I. Various antenna polarizations may be used in a TPTS to support a particular application; any polarization mismatch may be considered to be part of a link margin. Comparable GPS-based pseudolite (PL) links with slightly modified GPS receivers and a top-mounted GPS aircraft antenna demonstrated operational ranges of approximately 20 nmi in the prior art. These GPS-based PL ground-to-air links have substantial negative gain for the reception antenna (optimized for GPS) using a top-mounted GPS aircraft antenna (designed for GPS satellite reception) Table I shows the key parameters for a TPTS ground transmitter to TPTS airborne user link. Other links, TPTS transmitter to TPTS monitor, and TPTS IR/XP links are comparable.

TABLE 1

| Parameter | Value | | Description |
|---|---|---|---|
| $f =$ | 1215 | MHz | frequency (highest possible frequency selected here) |
| $S_{min} =$ | −125 | dBm | Minimum avg power received at aviation user for min S/N (w/no pulsing) |
| $G_t =$ | 9 | dBil | Gain of DME transmission antenna on ground (in LOS) |
| $G_r =$ | −2 | dBil | Gain of DME reception antenna on aircraft (in LOS) |
| $L_r =$ | 3 | dB | Loss of reception cable & antenna SWR mis-match |
| $L_t =$ | 3 | dB | Loss of transmission cable & antenna SWR mis-match |
| $L_p =$ | 2 | dB | Loss due to polarization mis-match |
| $L_{int} =$ | 3 | dB | Loss due to interference |
| $L_{atm} =$ | 2 | dB | Loss due to atmospheric absorption |
| $L_M =$ | 6 | dB | Link Margin (treat as a loss) |
| $dc =$ | 10 | dB | Loss due to pulse at duty cycle of 5%, |

TABLE 1-continued

| Parameter | Value | Description |
|---|---|---|
| R = | See Plot | i.e., 10log(1/dc); log is base 10 Range between the ground site and airborne user (neglecting LOS), [nmi] |
| $R_{t,\,peak}$ = | See Plot | Power transmitted at ground site (pulsed at dc), [dBm] and [W] |

Figure 3:
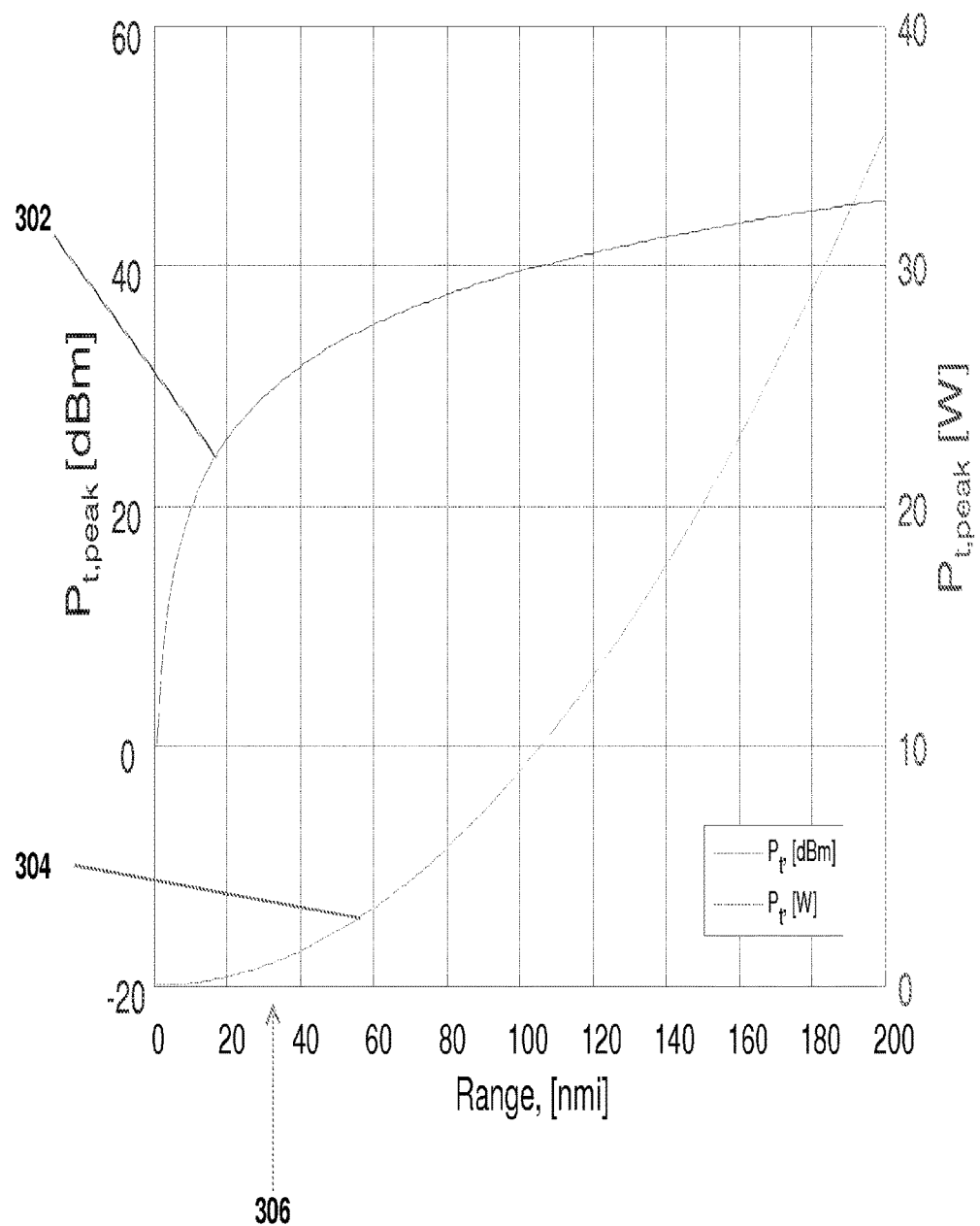
FIG. 3 is a graph of an example of peak power required for range.

The one-way Friis Transmission Link equation may be used as a basis for the calculation of the peak transmission power as a function of the operational range. The value of the parameters selected in Table 1 are conservative. FIG. 3 illustrates the peak power needed to obtain a particular operational range; the two traces represent the same data, but in units of dBm (solid trace; scale on the left) 302, and units of Watts (dashed trace; scale on the right) 304. FIG. 3 shows that based upon the parameters selected in Table 1, a peak transmission power of 29 dBm or 0.8 Watts is needed to support an operational range of 30 nmi 306. This includes conservative estimates for the parameters listed in Table 1 and a link margin of 6 dB.

At a TPTS station 200, measurement capability may be provided for a TPTS user whereby the TPTS transmitter transmits autonomously (i.e., beacon-like) two main signals. These signals may be transmitted at specific rates, with a particular pulsed PRN, synchronized in time, to a RBR time reference. This RBR signal 204 may be referenced to the North direction (i.e., True North) and designated as a "North Bearing Reference (NBR)" time reference. NBR is one example. Other examples may include South Bearing Reference (SBR), West Bearing Reference (WBR), or East Bearing Reference (EBR) signal designation. The NBR (or SBR, WBR, or EBR) signal is used as a time reference marker for the RBR. The TPTS RBR signal 204 may be used as the main range measurement signal that is autonomously transmitted out of an omni-directional antenna.

While the prior art DME signal structure format implements frequency and time (i.e., pulse modulation) isolation for its multiplexing technique, an example of the TPTS signal format may enable CDMA and time-division multiplexing techniques ("TDMA"). This may be similar to PL pulsing techniques to minimize the "near-far" problem associated with CDMA signal formats; however, other techniques may be used to help increase the dynamic range of the TPTS signal structure formats (i.e., code type and length, PRN, self-blanking, and code power multiplexing).

For the Autonomous TPTS mode of operation, two signal components may be present; 1) a TPTS Autonomous RBR Broadcast signal 204 and 2) a TPTS Autonomous Bearing Variable (BV) Broadcast signal 206. Each of these signal components may have a different PRN and be transmitted at the same nominal carrier frequency; however, the BV Broadcast signal has an additional modulation component. The RBR Broadcast signal 204 may be transmitted via an omni-directional antenna in a low duty cycle pulsed format, whereas the BV signal 206 may be pulsed at a medium duty cycle signal and then be transmitted via an azimuth scanning directional antenna, thereby producing a burst (i.e., pulsed like signal at a low duty cycle) signal to a user at a particular location in space.

Autonomous Broadcast Range and Bearing Reference (RBR) Signal Description

Figure 4:
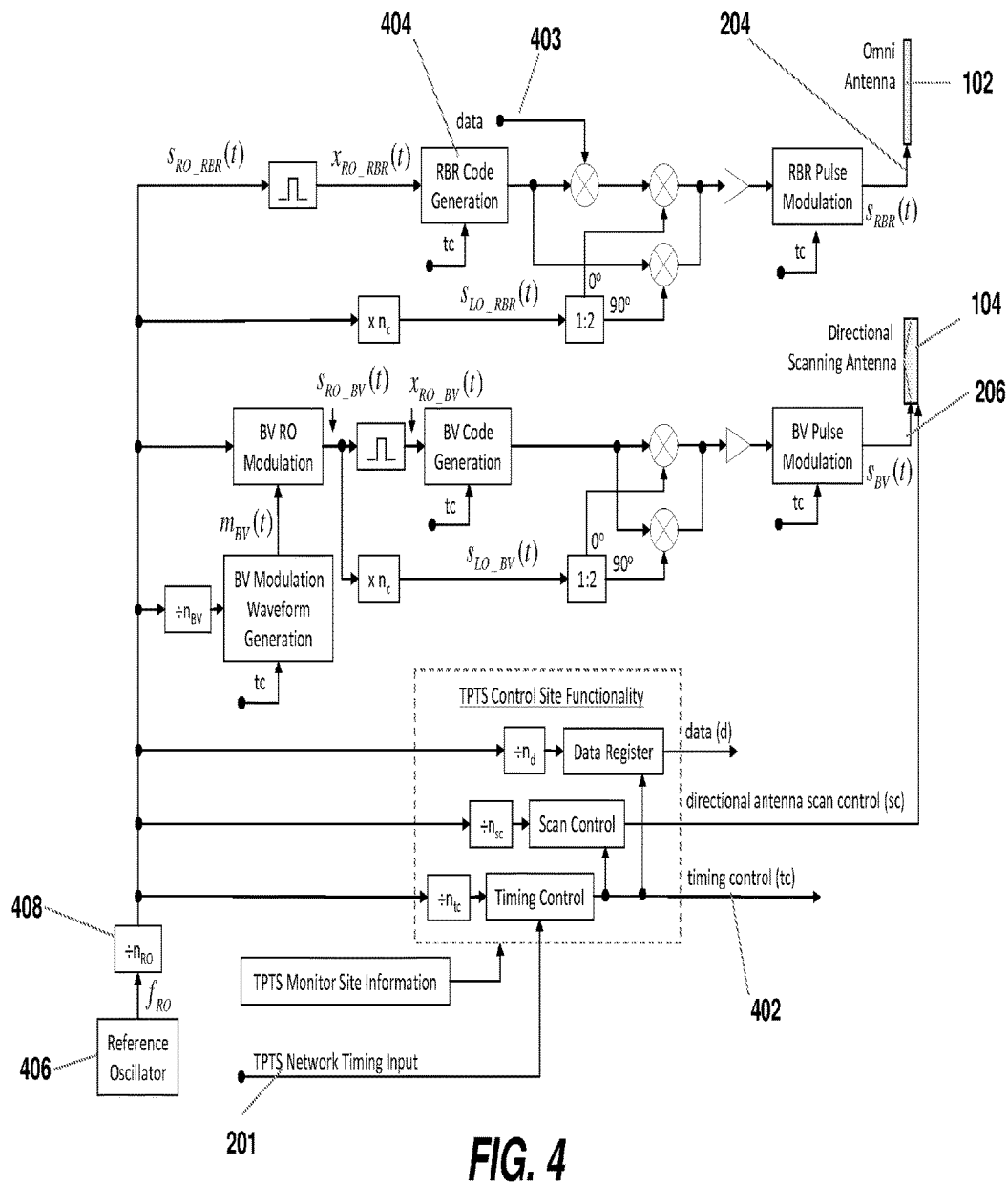
FIG. 4 is a functional block diagram of an embodiment of a TPTS Transmitter.

The TPTS Autonomous Broadcast RBR signal 204 transmitted by various TPTS stations may be transmitted with different PRNs, with different data encoded in the various message types from their respective TPTS station, but all RBR signals may be transmitted on the same carrier frequency at the same CDMA spreading code rate. FIG. 4 illustrates a functional block diagram of the RBR 204 and BV 206 signal generation and transmission that occur at a TPTS station 200. FIG. 4 illustrates the RBR 204 and BV 206 signal generation and key interfaces to the TPTS Control and Monitor functions. There may be some added advantage to transmit each TPTS RBR 204 signal with a small (but known) frequency offset to help reduce TPTS PRN code cross-correlation at the mobile user 202. This may be similar to a small Doppler offset in GPS to help separate each code tracking loop in frequency, e.g., 500 Hz offset in the carrier. In order to enhance clarity, this is not shown in FIG. 4. Each TPTS station 200 may transmit at least one RBR PRN signal that will be synchronized in time, corresponding to the beginning of the TPTS signal message data format subframe that is described herein. Thus, the RBR PRN may also be synchronized in time to the RBR timing reference 201 via the timing control ("tc") interface 402 shown in FIG. 4.

When implementing a TPTS, CDMA is the preferred technique for implementing spread spectrum transmissions however, other methods such as frequency hopping or time hopping may also be used for the spread spectrum signal correlation. While various spreading CDMA codes may be used for the TPTS autonomous broadcast signals, a preferred option would be to use maximal-length (m-sequence) spreading codes or modernized GPS PRN codes for the TPTS station RBR signal 204. An m-sequence may provide the lowest cross-correlation between various TPTS RBR signals 204 received at the user 202. A longer period m-sequence (e.g., of delay length 15) would make 21 unique m-sequences available. Another option may be to select a more numerous code family and maintaining synergy with GPS receiver code families and chose L5 or L1C codes. As one skilled in the art will recognize, the selection of a spreading code and its parameters will depend upon the application and frequency band where the TPTS is implemented. The RBR CDMA code generation is illustrated as the RBR Code Generation block 404 shown in FIG. 4.

Data 403 formed from the TPTS control site 108 may be added to the spreading code, and then modulated onto the carrier. As illustrated in FIG. 4, the in-phase (I) carrier component of the RBR signal is used to transmit the data and the quadrature (Q) carrier component, is illustrated to be transmitted as a data-less channel to aid in receiver tracking. The data 403, illustrated in FIG. 4, may also be transmitted using a separate communications link to be transmitted to the mobile user 202. This communications link may be a, digital data link, cellular, satellite, or aforementioned TPTS RBR link.

An example of the TPTS Autonomous Broadcast RBR spreading code may be pulsed to decrease the cross-correlation (i.e., reduce self-interference) between different power level TPTS signals received at the user 202. The pulsing format for each TPTS autonomous broadcast signal may be randomized using a known and defined format, such that all (or almost all) of the spreading code chips of the CDMA code selected may be received within the receiver correlation integration interval. Using Wideband PL with the GPS code formats, the duty cycle may be less than 5%. As shown in FIG. 4, pulsing is done at radio frequency (RF), after the power amplification, to obtain better on-to-off isolation.

Each TPTS RBR signal 204 may be pulsed with a known and well defined format to enable CDMA/TDMA power multiplexing and receiver self-blanking to additionally help minimize the CDMA cross-correlation between spatially diverse TPTS stations. Different TPTS stations 202 may transmit different, and well defined pulsing formats. The concept of receiver self-blanking is presented under the pre-condition that the user receiver has already an estimated PVT solution. The TPTS may include data on the TPTS signals including correction, transmitter site locations, system configuration and timing information in transmissions to a user. For a given RBR signal 204 received at a user location, the beginning of each TPTS subframe may be known, as well as the TPTS station identifier (ID), and hence the particular pulse pattern used to pulse modulate the RBR signal 204 from that particular TPTS station 200. The user 202 may also have an estimate of range to that TPTS station. Thus, the TPTS user receiver equipment may allow the RBR signal chips to pass into the receiver correlation process and "ground out" the input signal when the RBR chips are not being received by the receiver at the particular range. The user TPTS receiver may have all of the information needed to accomplish this time division with knowledge of the TPTS transmitter site location, the estimated TPTS user location, and the specific TPTS RBR pulse pattern used by that particular TPTS station 200. This will help minimize noise received and cross-correlation by other TPTS CDMA signals entering into the receiver during the "off times" of the desired TPTS channel correlator.

CDMA/TDMA power multiplexing with different, well defined pulsing formats used for each TPTS transmitter site and a self-blanking technique may be implemented in an embodiment of the user equipment as described above. As illustrated in FIG. 4, the TPTS station may transmit one RBR signal 204 with a specific PRN. Using the concept of CDMA/TDMA power multiplexing, a TPTS station may transmit several, for example 3 RBR signals, each with different PRNs and unique pulsing patterns, and at different power levels. In an exemplary embodiment, these three RBR signals may represent a short range RBR signal (e.g., 0-4 nmi PRN), a medium range RBR signal (e.g., 0-30 nmi PRN), and a long range RBR signal (e.g., 0-200 nmi). This may help increase the operational dynamic range for the CDMA/TDMA based TPTS when implemented with the self-blanking technique described above. As an operational example, consider a user 202 at some distance from a given TPTS transmission site (e.g., 100 nmi out). In such circumstances, the user platform may calculate a user solution with a TPTS time solution. As the distance from the user 202 to the TPTS transmission site decreases, multiple RBR PRNs may be tracked. At some point, non-linearity's may exist in the TPTS user antenna/receiver, resulting from the strong long range RBR PRN, so the user 202 may then transfer to the Medium Range RBR signal and be actively blanking out the long range RBR signal in the medium range RBR signal receiver channel with a self-blanking technique. As the user 202 becomes even closer to the TPTS transmission site, the user equipment may be tracking the medium range RBR PRN and the short range RBR PRN. Due to a self-blanking technique being implemented in the short range RBR PRN channel, both the long range RBR PRN and medium range RBR PRN signals may be blanked. In an exemplary implementation, a single (i.e., lower power) RBR Signal would be implemented first; with a transition to two and then three power leveled RBR signals to increase the service volume. From the data in Table 1, and illustrated in FIG. 3, a peak transmission power for the short range signal would be 11.6 dBm or 0.0143 watts to support a range of 4 nmi. To support the medium range signal, a peak power transmission level of 29 dBm or 0.8 watts would be needed to support a range of 30 nmi. The Long Range signal would be transmitted at a power level of 45.5 dBm or 35.7 watts for an operational range up to 200 nmi based upon the parameters in Table 1, and illustrated in FIG. 3.

Guard times may be implemented in the pulse pattern allocations. In an embodiment, the size of the guard times and the probability of multiple TPTS stations RBR pulses arriving at the user equipment at the same time, due to geometry, may be determined. Additionally, soft self-blanking at RF and hard self-blanking at the digital sample level may be determined for an embodiment.

Autonomous Broadcast Bearing Variable (BV) Signal Description

The purpose of the autonomous broadcast ("BV") signal 206 is to add bearing capability to the TPTS with reference to the RBR signal 204. The BV signal 206 may be transmitted at nominally the same frequency as the RBR signal 204, except the code and carrier will be "swept" across the nominal code and carrier rate, at a relatively low rate and the frequency deviation will be very small. While the modulation waveform may be any analog, digital, linear, or non-linear format, a sinusoidal waveform may be used to provide good angular resolution. This frequency modulation may be generated after the reference oscillator that drives the BV signal 206 generation, so that both the code and carrier are affected by this low rate bearing modulation. Both the code and the carrier rates may be modulated by the low rate frequency term, in accordance with FIG. 4 and both the BV code and carrier may be used for bearing determination in comparison with the RBR code and carrier terms. The frequency modulation rate may be proportional to the BV antenna scan rate and the frequency deviation may be designed for the maximum desired frequency variation on the BV signal code and carrier rates, respectively. In an exemplary embodiment, the frequency deviation on the code may be on the order of 5 Hz to produce a frequency deviation of the carrier on the order of 500 Hz maintaining code and carrier coherency. As illustrated in FIG. 4, this frequency deviation (generated by the BV modulation waveform generation) may be synchronized in phase to the RBR signal 204 (e.g., the NBR) timing reference because of a common clock and timing control. The rate of the frequency modulation may be low and synchronized to the direction azimuth scanning antenna. This may be most easily be implemented with an electronically scanned antenna array that scans a small beamwidth in azimuth.

As shown in FIG. 4, no data is illustrated to be sent on the BV signal 206 component. The I and Q components are shown, but if no data is sent on this signal, then only the I carrier channel need be sent. One skilled in the art would recognize that data could also be sent to the BV signal channel.

The Broadcast BV Signal 206 may be pulsed at a medium duty cycle, and will be seen as effectively pulsed at a low duty cycle at a particular location in space (e.g., at a static TPTS monitor antenna or at a user) with the additional antenna scanning effect. The desired net effective duty cycle may be on the order of a nominal 5% and may be a function of the antenna scan rate, antenna beamwidth, distance between the TPTS station, and the user 202. Users 202 at a larger distance from the TPTS transmission site may see a duty cycle slightly larger than the nominal duty cycle, and users at a close range relative to a TPTS transmission site may see an effective duty cycle less than the nominal duty cycle.

Figure 5:
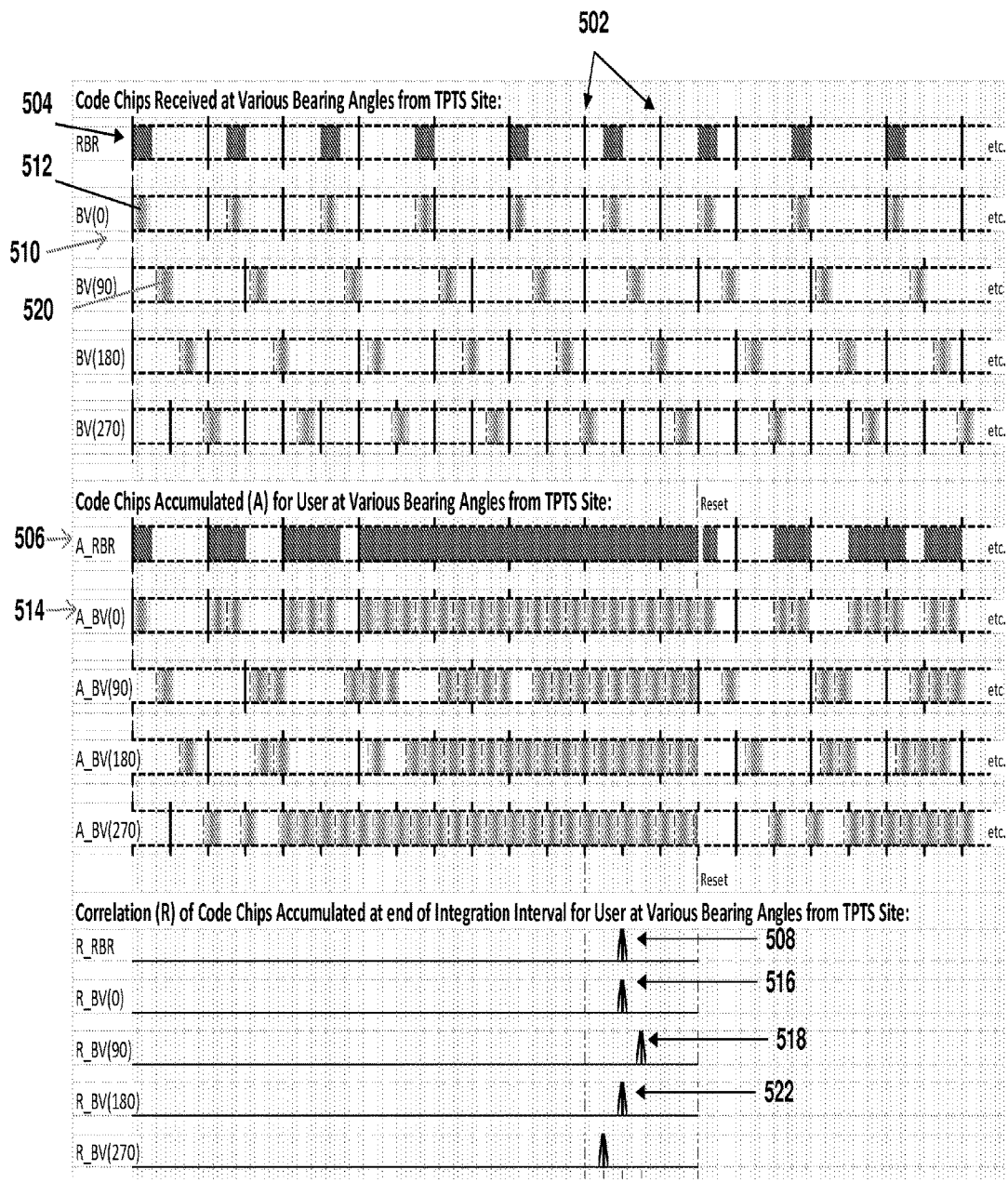
FIG. 5 is an example of an illustrative timing diagram of representative TPTS signals.

FIG. 5 illustrates an example of the TPTS autonomous RBR and BV code epoch ("CE") timing, accumulated ("A")

code chips, and correlation ("R") of accumulated chips at the end of the integration for various user bearing angles from a TPTS transmission site. In FIG. 5 the RBR signal may be transmitted out of the TPTS station omni-directional antenna, with a pulsed PRN, as illustrated by the first row 504 in FIG. 5. The CE periods for the codes are shown in FIG. 5, as the distance between the dark vertical lines in the periodic codes. Two CE edges for the RBR signal are shown in FIG. 5 as 502 for line 504. In FIG. 5 the RBR signal is illustrated as a 25% duty cycle signal for illustration purposes; the actual duty cycle may be different. The solid parts 504 within the RBR CE interval represent the transmission time of the RBR PRN. As illustrated in FIG. 5, after 4 CE intervals of the RBR PRN, all RBR PRN chips would be received, and may be integrated together. In an actual implementation receipt and integration is expected to be longer (e.g., ~10's RBR CE intervals). For example, an integration interval may be equal to for example, seven RBR CE intervals. Referring to FIG. 5, shown in the second grouping of signals are the accumulated chips over seven RBR CE intervals, as shown on the A_RBR line 506. At the end of the integration interval, the data may be used for correlation. A correlation peak for the RBR signal may be produced as depicted in FIG. 4 on the R_RBR line 508, where the correlation peak is illustrated in FIG. 5 in the middle of the 8th CE interval for the RBR signal. The correlation peak 508 is illustrated within the same CE interval as the final CE interval for illustration purposes; as all of the data would need to be received to be used in the actual correlation, as one skilled in the art would understand. After the integration and correlation, the accumulation, integration, and correlation processes may be reset and repeated.

The frequency modulation rate and phase offset used to modulate the BV signal may be synchronized to the RBR signal 204 (e.g., the NBR) timing reference in such a fashion that the phase delay between the RBR (e.g., NBR) signal and the "phase 0" of the frequency modulation signal may be zero degrees. This is illustrated in the second row of FIG. 5, whereby there may be zero delay between the RBR CE received at the user via the TPTS omni-directional antenna and the BV signal (BV(0)), CE received at the user via the TPTS directional scanning antenna 104, when the user is located in a bearing angle of zero degrees from the TPTS station. In FIG. 5, this BV signal received by the user is designated as BV(0) 510 where the net pulses received are shown as the transmission areas 512. The RBR CE period equals the BV(0) CE period by design. The CE rate should not equal the TPTS scanning azimuth rate, but should "slide through" the BV spreading code chips received by a user, at a specific location in space so that most BV spreading code chips are accumulated by the user receiver equipment, as depicted in the A_BV(0) line 514 of FIG. 5, over the TPTS user equipment integration window (7 BV(0) CE intervals in this example) to produce the correlation for the BV(0) signal (i.e., (R_BV(0), 516) in the BV correlator channel.

In the FIG. 5 illustration, the code rate variation (modulation) is such that the clock driving the code generation for the BV signal would be varied back and forth across the nominal code generation rate for the RBR signal. Thus, the signal design for this illustration would slow down the BV CE rate for a user signal received at 90 deg via the directional scanning antenna 104. For a user at 180 deg, the BV code rate would be the same, and for a user 202 at 270 deg bearing from the TPTS station, the BV CE rate would "speed up". Thus, there may always be the same number of chips in the CE, but the code rate will be varied; this may produce an extremely small variation of the signal bandwidth.

Now consider if the user was at a bearing angle of 90 deg from the TPTS station. The RBR signal 204 will be received and correlated to produce correlation peak 508. The BV signal 206, may be received by the user at a bearing angle of 90 degrees from a TPTS station (i.e, BV(90) 518), and correlated to produce correlation peak 518. as as illustrated in FIG. 5. Note that since the BV signal 206 is frequency modulated (both code and carrier), the beginning of the CE for the BV signal will be delayed with respect to the RBR CE, as a function of the bearing angle, since the period of the CE for a user 202 at 90 deg bearing from a TPTS station is longer than that of the period of the RBR CE. There will still be the same number of chips in the CE, but the chips will take longer to clock out for the user 202 at a bearing angle of 90 deg from the TPTS station. The user 202 at this bearing angle may only be exposed to the signal in space, as presented by the TPTS azimuth scanning transmission antenna 104 as illustrated by the shaded areas of BV(90) 520. These chips will be accumulated over the user equipment integration interval (i.e., A_BV(90)) as shown in FIG. 5, and then correlated at the end of the integration interval (7 in this illustration), to produce the correlation peak for the BV(90) signal, illustrated as R_BV(90) 518 in FIG. 5. Note that the correlation peak of the BV(90) signal (R_BV(90) 518 is delayed from the correlation peak of the RBR signal (i.e., R_RBR 508). This delay is a function of the user bearing from the TPTS station. Thus, in the TPTS user equipment receiver, the time delay between the correlation peaks in the RBR correlator channel and the BV correlator channel may be used as a basis for the TPTS user determination of bearing angle from the TPTS station, with knowledge of the frequency deviation, the phase reference (i.e., referenced to NBR). Note that the TPTS scanning transmission antenna 104 for the BV signal 206 is used only to limit the reception of the BV signal at the user location, during the time period that corresponds to the CE time delay, corresponding to the bearing angle of the user with respect to the TPTS station. The TPTS directional scanning antenna 104 beamwidth accuracy does not have a direct impact on the bearing accuracy provided by the BV signal, with reference to the RBR signal 204, since the bearing information is encoded into the relative time delay between the RBR correlation peak, and the BV correlation peak.

As illustrated in FIG. 5, if the user was at a bearing of 180 deg from the TPTS station, the PR will be extracted from the correlation peak of the RBR signal (R_RBR) 508, and the bearing information will be extracted from the delay of the correlation peak in the BV channel (i.e., R_BV(180) 522) with respect to the correlation peak in the RBR channel 508. FIG. 5 also illustrates the delay for a user at a bearing of 270 deg from the TPTS station. Thus, regardless of the bearing of the user from the TPTS station, the delay of the correlation peak in the BV channel with respect to the correlation peak in the RBR channel, may produce a basis for bearing angle determination from the TPTS station with knowledge of the frequency deviation and phase offset.

As presented above, the BV signal may be transmitted via a directional antenna scanning in azimuth 104 in one direction; however, other configurations are possible to help minimize the correlation peak error for enhanced bearing accuracy determination. Selection of the BV azimuth scanning antenna parameters should be selected with consideration to the antenna scan rate, beamwidth, direction, azimuth spatial coverage, CE rate for the RBR 204 and BV 206 signals, and BV medium pulsing duty cycle to optimize code tracking resolution in the receiver. For example, an alternating antenna azimuth scan format (i.e., clockwise, then counter-clockwise) may help to average out any "smearing" of the correlation peak due to the changing CE period of the BV signal 206.

As illustrated in FIG. 5, the CE period of the BV(0) signal and the CE period of the BV(180) are equal to each other and produce zero delay between the R_RBR correlation peak 508, and the R_BV(0) correlation peak 522. The open loop correlation peak periods, CE edges, range estimate, and pulsing pattern from the known TPTS station may be used to resolve this bearing angle ambiguity. If the TPTS network timing is not available, or significant error exists in the timing reference, accurate but slightly degraded bearing information may be derived from the TPTS station. This is because the user receiver clock error with be the same on the RBR 204 and BV 206 signal measurements, and will thereby cancel when the two correlation values are subtracted in the user processing. This is because the bearing information is encoded into the CE delay of the BV signal 206 with respect to the RBR signal 204.

The carrier phase (CP) of the RBR signal 204 and the CP of the BV signal 206 may also be used for bearing determination. Since both of these signals are generated from a common frequency reference, the RBR CP channel phase lock loop (PLL) and BV carrier PLL outputs may be compared to produce a phase difference that corresponds to the bearing from the TPTS site. The delay between the RBR correlation peak and the BV correlation peak using the RBR CE and BV CE respectively, may be used as a "course" bearing determination, and the frequency offset (such as low rate Doppler) between a RBR CP PLL and a BV CP PLL may be used for a fine bearing determination.

Analytical Expressions for the Autonomous Broadcast Range and Bearing Reference (RBR) 204 and Autonomous Reference Broadcast Bearing Variable (BV) Signals 206

Analytical Expressions for the RBR Signal

Referring to FIG. 4, TPTS signals may be generated with reference to a frequency reference oscillator ("RO") 406. If the RO frequency needs to be divided down, then it may be divided down by $n_{RO}$ 408. If the RBR code rate is the same as the RO 406 frequency then it may be used directly and $n_{RO}$ 408 will be one. Thus, the RO 406 for the RBR signal 204 may be described as:

$$s_{RO\_RBR}(t) = A_{RO\_RBR} \cos(\omega_{RO\_RBR} t) \qquad \text{EQ(1)}$$

where:

$A_{RO\_RBR}$ = Amplitude of the $RO$ $RBR$ signal, [V]  $\qquad$ EQ(1)

$\omega_{RO\_RBR} = \dfrac{\omega_{RO}}{n_{RO}}$ = frequency of $RO$ $RBR$ signal, [rad/s].

For the clock to generate the RBR spreading code, digital version of EQ(1) may be produced and represented as:

$$x_{RO\_RBR}(t) = \text{sgn}[A_{RO\_RBR} \cos(\omega_{RO\_RBR} t)] \qquad \text{EQ(2)}$$

where:

$A_{RO\_RBR}$=Amplitude of the RO_RBR, [V]
$\omega_{RO\_RBR}$=frequency of RO_RBR digital clock, [rad/s].

The "sgn" function of EQ(2) may be thought of an analog-to-digital converter whereby the sinusoidal function in EQ(2) is turned into a digital clock (i.e., positive voltages of get mapped to "1" and negative voltages of get mapped to "0"). This digital clock may be used as the clock to generate a bipolar RBR spreading code.

The division or multiplications block illustrated in FIG. 4 represents a frequency division or frequency multiplication, respectively. For the RBR carrier, the RO 406 frequency is multiplied by $n_c$. The local oscillator ("LO") may be described as:

$$s_{LO\_RBR}(t) = 2A_{LO\_RBR} \cos(\omega_{LO\_RBR} t) \qquad \text{EQ(3)}$$

where:

$2A_{LO\_RBR}$=Amplitude of the LO RBR signal, [V]
$\omega_{LO\_RBR}$=frequency of the LO signal, [rad/s]
$f_{LO\_RBR} = n_c f_{RO\_RBR}$, [Hz].

After the data and RBR code multiplication onto the LO in EQ(3) is performed to produce a binary phase shift keyed ("BPSK") signal, the final pulsed CDMA RBR signal may be represented as:

$$s_{RBR}(t) = d(t) x_{SC\_RBR}(t) p_{RBR}(t) A_{c\_RBR} \cos(\omega_{c\_RBR} t) \qquad \text{EQ(4)}$$

where:

$d(t)$=TPTS data, [V]
$x_{SC}(t)$=RBR spreading code, [V]
$p_{RBR}(t)$=RBR pulsing sequence, [V]
$A_{c\_RBR}$=Amplitude of the RBR signal, [V]
$\omega_{c\_RBR}$=frequency of the RBR signal, [rad/s].

Here, BPSK is used for the final modulation technique; however other modulation techniques could be implemented as one skilled in the art would appreciate.

Analytical Expressions for the BV Signal

The RO 406 used for the RBR signal 204, described in EQ(1) may also be used as the original RO for the BV signal 206 generation. For the BV signal 206, the low frequency "message" signal that will be used to modulate the RO 406 for the BV signal 206 generation may be represented as:

$$m_{BV}(t) = A_m \cos(\omega_m t) \qquad \text{EQ(5)}$$

where:

$A_m$=Amplitude of the "message", [V]
$\omega_m$=frequency of "message", [rad/s].

The signal in EQ(5) may be described as the "message", which is typical for an angle modulated signal. The rate of this signal should be selected based on the period of the chips being exposed to the user, which is the antenna scan rate. The message signal in EQ(5) will be used to frequency modulate the RO signal 406 presented in EQ(1). This resulting signal may be represented as:

$$s_{RO\_BV}(t) = A_{RO\_BV} \cos(\omega_{RO\_RBR} t + \beta_f \sin(\omega_m t)) \qquad \text{EQ(6)}$$

where:

$A_{RO\_BV}$ = Amplitude of the $RO$ $BV$ signal, [V] $\qquad$ EQ(6)

$\beta_f = \dfrac{\Delta f}{f_m}$ = modulation index for the $RO$ $BV$ signal $\Delta f = A_m k_f$ = frequency deviation of the $RO$ $BV$ signal (i.e, one way from center), [Hz]

$k_f$ = sensitivity of the frequency modulator, [Hz/V]

$\omega_{RO\_RBR}$ = frequency of $RO$ $RBR$ signal, [rad/s].

In EQ(6) the frequency deviation represents the amount of "code Doppler" desired to be introduced onto the BV spreading code and may be estimated to be 5 Hz in this example. For the RO BV signal, the frequency modulation index may be very small (i.e., <<1) As a result, this RO BV signal may be categorized as a narrowband FM signal. This narrowband FM RO BV signal may then be converted into a digital clock as:

$$x_{RO\_BV}(t)=\text{sgn}[s_{RO\_BV}(t)] \quad \text{EQ(7)}$$

The digital RO BV clock described in EQ(7) will be used to generate the BV spreading code. The narrowband frequency modulated RO BV signal shown in EQ(6) may also be used to generate the LO term for the BV signal. The phase of the RO BV signal is the argument of the cos function in EQ(6). Taking the time derivative of this phase produces the RO BV frequency, that may be multiplied by the $n_c$ term, to produce the frequency modulated LO BV signal as:

$$f_{LO\_BV}(t) = n_c f_{RO\_BV}(t) = \frac{n_c}{2\pi}\left[\frac{d\,\phi_{RO\_BV}(t)}{dt}\right]$$

where:

$$\phi_{RO\_BV}(t)=(\omega_{RO\_RBR}t+\beta_f \sin(\omega_m t)), [\text{rad}], \quad \text{EQ(8)}$$

i.e., phase of RO BV signal in EQ(6).

Using the frequency expression in EQ(8), the LO for the BV signal may be described as:

$$s_{LO\_BV}(t)=2A_{LO\_BV}\cos(\omega_{LO\_BV}(t)t) \quad (9)$$

where:
$2A_{LO\_BV}$=Amplitude of the LO BV signal, [V]
$\omega_{LO\_BV}(t)=2\pi f_{LO\_BV}(t)$=frequency of the LO signal, from (8), [rad/s].

After the BV code multiplication onto the LO in EQ(9) to produce a BPSK signal, the final pulsed CDMA BV signal may be represented as:

$$s_{BV}(t)=x_{SC\_BV}(t)p_{BV}(t)A_{c\_BV}\cos(\omega_{c\_BV}(t)t) \quad \text{EQ(10)}$$

where:
$x_{SC\_BV}(t)$=BV spreading code, [V]
$p_{BV}(t)$=BV pulsing sequence, [V]
$A_{c\_BV}$=Amplitude of the RBR signal, [V].

Again, BPSK may be used for the final modulation technique; however other modulation techniques could be implemented as one skilled in the art would appreciate.

TPTS Monitor Site

Each TPTS station 200, may include a TPTS monitor antenna 106 to receive the various TPTS signals to be monitored. This monitoring may be done receiving the signals in space radiated by the local TPTS site and provide various range, bearing, timing corrections, integrity, and performance characteristics information to the TPTS control site. TPTS signals transmitted may be monitored and corrections may be formed at the co-located TPTS control site 108 and encoded onto TPTS broadcast signals. Thus, the TPTS is inherently a differentially corrected system. A single TPTS monitor site, with monitoring antenna 106 or multiple TPTS monitor sites, with associated monitoring antennas may be spatially separated around the TPTS site transmission antennas to provide redundancy for accuracy, continuity, availability, and integrity purposes. Each TPTS transmitting antenna, and TPTS monitor antenna may be surveyed with respect to the WGS-84, the International Terrestrial Reference Frame (ITRF) datum, or other datum for the specific application. The survey of these antenna sites may be performed and validated prior to operation of the TPTS and remain valid in the event of a GNSS outage. One skilled in the art will appreciate that the signal monitory subsystem may be performed by the monitoring antenna as well as associated receiver system that may be co-located with the monitor antenna or located at the control site. One skilled in the art will also recognize that the TPTS signals may be monitored at other junctions such as at a coupled RF location.

TPTS Control Site

As illustrated in FIG. 1 the TPTS control site 108 may interface to a TPTS master control site to receive external timing and may also be responsible for processing range, bearing, timing, performance parameters, and integrity information and encoded data into a TPTS transmission signal message data format. This information may be conveyed to the user 202 via a communications link that may be the RBR signal 204. Once the mobile user has received and decoded the various message types, the user equipment may apply the appropriate range (i.e., PR) correction, bearing correction, transmitter clock or offset correction for the type of user solution desired.

TPTS Signal Message Data Format

Data processed by the TPTS control site 108 may be formatted into various message types and encoded onto a communications link. This communication link may be the RBR signal for transmission or other type of communications link such a digital data link, satellite communications link, cellular communications link. To obtain some synergy with GPS receivers, a data format similar to the GPS Civil Navigation ("CNAV") data format may be used for data encoding. Such a data format is designated as a TPTS CNAV ("TNAV") message format. Similar to the CNAV message format, all data fields may begin with a preamble, followed by the signal PRN, message type identifier ("MTID"), week number ("WN"), time of week ("TOW"), and an alert flag, followed by a data field, with a cyclic redundancy code ("CRC") field at the end of the message. GPS-based WN & TOW, may be propagated by the TPTS if GPS timing is lost. The beginning of each message block (from the beginning of the preamble to end of CRC field) may be synchronous to the TPTS system timing and designated as a TPTS subframe. A shorter subframe length of 6 seconds, as is used in GPS CNAV, may be used. The I-channel may be used to pass data on the RBR, IR, and XP signals and the Q-channel could remain data-less to aid acquisition for the user receiver. Table 2 provides an exemplary list of the various MTIDs and a corresponding description when the data may be encoded onto the autonomous RBR signal broadcast. The information contained within the MTID 2 listed in Table 2, may also include information pertaining to any specifics on the BV signal 206 transmitted by the TPTS Stations. Thus, there may not be a need to transmit any data on the BV signal 206 to allow for better integration of this signal.

TABLE 2

| MTID | MESSAGE TYPE DESCRIPTION |
| --- | --- |
| 0 | Test Message (Default) |
| 1 | Platform Identification Information (e.g, ATC Code) |
| 2 | BV Signal Information (PRN, etc.) |
| 3 | Pseudorange Correction for RBR signal component |
| 4 | Pseudorange Correction for BV signal component |
| 5 | Carrier Phase Corrections for RBR signal component |
| 6 | Carrier Phase Corrections for BV signal component |
| 7 | Transmitter Clock Corrections |
| 8 | TPTS, GPS to UTC time information |
| 9 | Additional Bearing Variable Corrections |
| 10 | Transmitter Station Coordinate Information |
| 11 | Transmitter Station Configuration Information |
| 12 | Power Messaging Information (levels received and sent) |
| 13 | TPTS Almanac data for other TPTS stations |
| 14 | RBR to BV Inter-channel Group Delays |
| 15 | IR-to-XP Group Delays |
| 16 | Atmospheric Information |
| 17 | Integrity Information |
| 18 | Text message |

Referring to Table 2, MTID 12 is listed as a power message and may be used to help manage transmission and reception power levels. This type of power management may be used to control broadcast, IR and XP transmission power levels. The power messages described herein may be used to report what power level/mode is being transmitted, and what power level is being received. Power level management may be performed in addition to pulsing techniques. Power level management may be performed in lieu of pulsing for a particular application, when the power management and spread spectrum code implemented provide sufficient signal isolation to minimize signal cross correlation.

TPTS Interrogation/Reply (IR/XP) Mode

With reference to the embodiment shown in FIG. 2, the TPTS provides for an active IR/XP mode whereby the user 202 may selectively interrogate a specific or all TPTS stations to provide a direct range measurement capability to the user. Each reply from the TPTS station 200 may have a fixed transponder reply processing time established and controlled by network timing and thereby allow a user to accurately calculate an estimate of range to each TPTS station.

A TPTS station transponder may decode the user TPTS CDMA IR and if a valid PRN and platform identification are decoded, then the TPTS station transponder may reply via a station omni-directional antenna 102. To gain some synergy with new generation GPS receivers, CDMA code selection may be used (e.g., L5 or L1C) for the IR/XP Mode signals. For aviation applications, the L5 codes are well suited for these formats because of their good performance and synergy with the L-band for aviation. Different PRNs may be selected for the IR link and XP link for other applications (e.g., cellular). These TPTS IR/XP mode PRNs may be different than the TPTS autonomous mode PRNs for a specific TPTS station. For an aviation type application, the existing, or a limited number of DME channels may be utilized for the active IR/XP Mode. The IR and XP may be on different frequencies to maintain signal isolation within the IR and XP transceivers, and the existing +63 MHz transmit to receive offsets may be used, within the existing DME channelization scheme. Any offset group delays may be built into the XP replay time, and controlled by the TPTS control site or alternatively transmitted in MTID 15 message type. User transponder group delays may be compensated within the TPTS user control circuitry. Static group delays may be calculated for the user equipment and then used directly. Provisions for the MTID 15 may be implemented for any additional corrections. Temperature variations of these offset frequency delays in TPTS equipment may be within the error budget for the TPTS application and therefore may be compensated for or validated as one skilled in the art would understand. The message encoded from the user IR may draw upon the MTIDs identified and new MTID formats may be adopted as the need arises for various applications of the TPTS. For other types of applications (e.g., cellular) a spreading code that facilitates easy integration with some existing user equipment may be utilized.

TPTS Example Parameters

One advantage of a TPTS that utilized CDMA is that all of the Autonomous RBR 204 and BV 206 signals from all TPTS stations would be on essentially the same frequency. Over time, for aviation applications, this could reduce the number of legacy DME users if they transition to a TPTS based system. Directly related to the carrier frequency selection for the Autonomous RBR and BV signals, would be the PRNs code rate. The code rate will directly affect the bandwidth and the number of DME channels co-occupied with the TPTS signals. For example, if a code chipping rate on the order of 1 MHz is selected, the Autonomous TPTS signals would be present in not only the selected DME channel, but also a number of adjacent DME channels. A viable approach could also be the use of dedicated channels/bands for the Autonomous Mode signals and two different frequency channels/band for the Active IR/XP Mode signals, within the DME band. An advantage to co-occupy an existing DME channel is the fact that the TPTS signals are relatively low in signal level, and that CDMA systems are very tolerant to pulsed interference. As stated previously, the frequency deviation of the code is expected to be small (e.g., 5 Hz), and with a $n_c$ multiple of, for example 100, will produce 500 Hz frequency deviation on the BV carrier. As for the frequency modulation rate of the "message" of the BV RO, this will be the same as the antenna scan rate, so that the same frequency (code and carrier) deviation is observed at a specific bearing angle from a TPTS station, on each scan of the BV transmission antenna, respectively.

Figure 6:
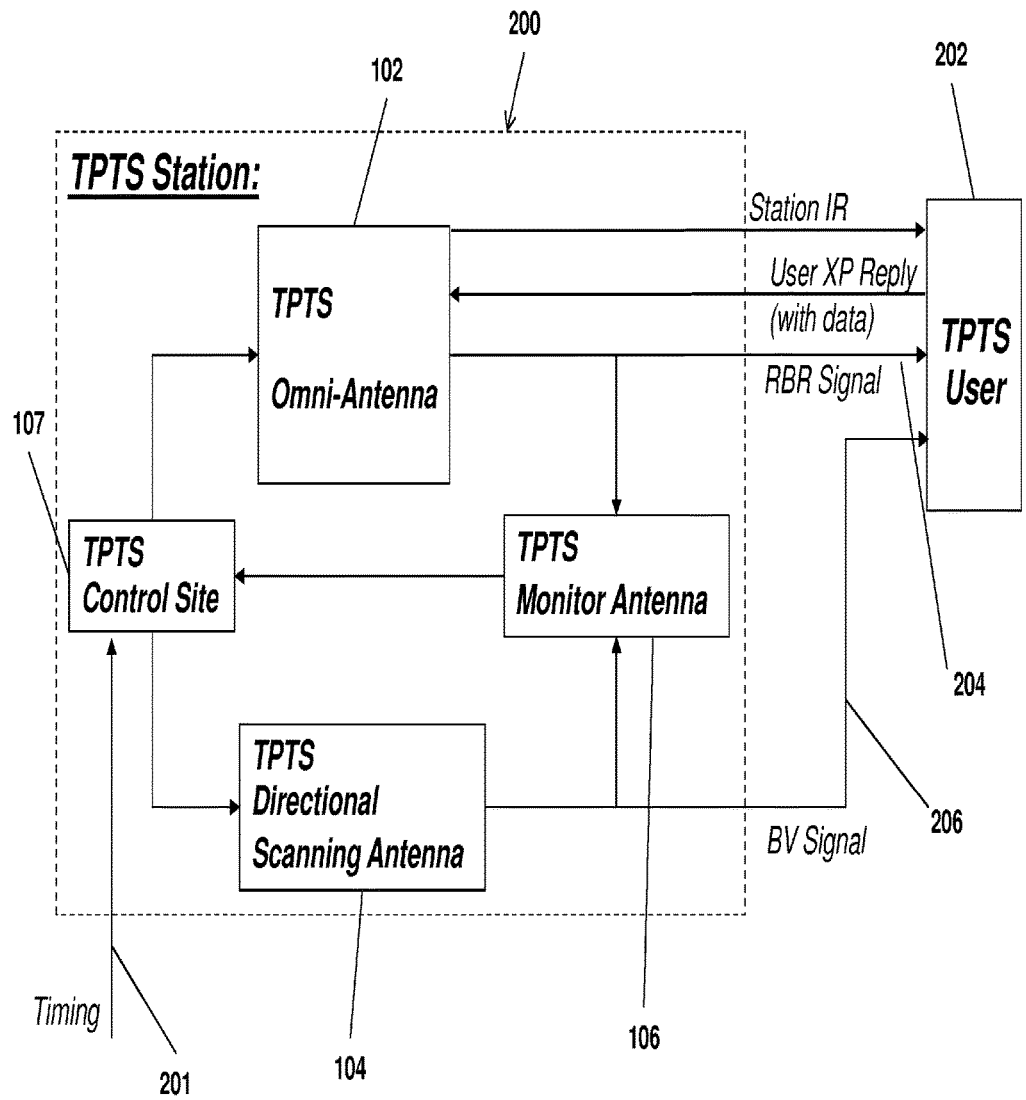
FIG. 6 is a block diagram of a second embodiment of a TPTS.

FIG. 6 is a block diagram of a second embodiment of the TPTS. This embodiment is similar to the embodiment presented in FIG. 2, except the Active IR/XP processing is performed by the TPTS station 200 whereby the user 202 would receive the IR and transpond a reply (i.e, XP). In doing so, the user may transmit back, in a timely fashion its correlation measurements made from the RBR signal 204 (i.e., R_RBR, 508) and the BV signal 206 (e.g., R_BV(90) 518, (if the user was at a bearing of 90 from the TPTS station). The TPTS station may then process the user measurement data to determine the user bearing from the TPTS station, position, velocity or time solution. This solution data could be used for remote positioning of the user (e.g., for remote tracking, E911) or sent back to the user for use. All of the other TPTS system function described above may be similar.

Figure 7:
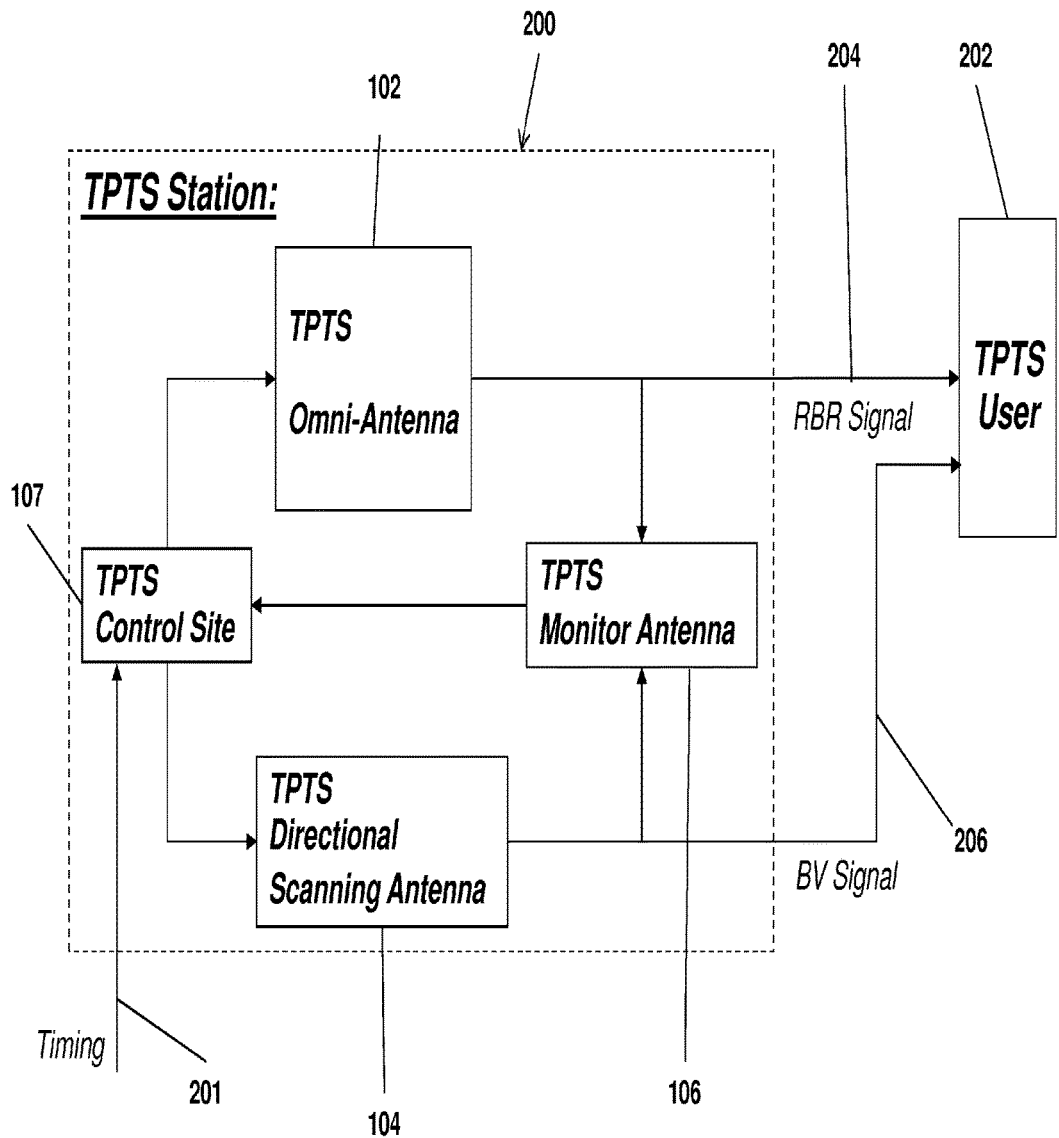
FIG. 7 is a block diagram of a third embodiment of a TPTS Station.

FIG. 7 is a block diagram of a third embodiment of the TPTS. This embodiment does not have an active IR/XP mode by the TPTS user 202 or TPTS station 200, and may be useful when the user solution involves the determination of bearing from the TPTS station. The bearing is produced in a similar fashion as was described above by determining the difference in the correlation measurements made from the RBR signal 204 (i.e., R_RBR, 508) and the BV signal 206 (e.g., R_BV(90), 518 (if the user was at a bearing of 90 from the TPTS station). This bearing information can be processed with the user TPTS receiver.

Figure 8:
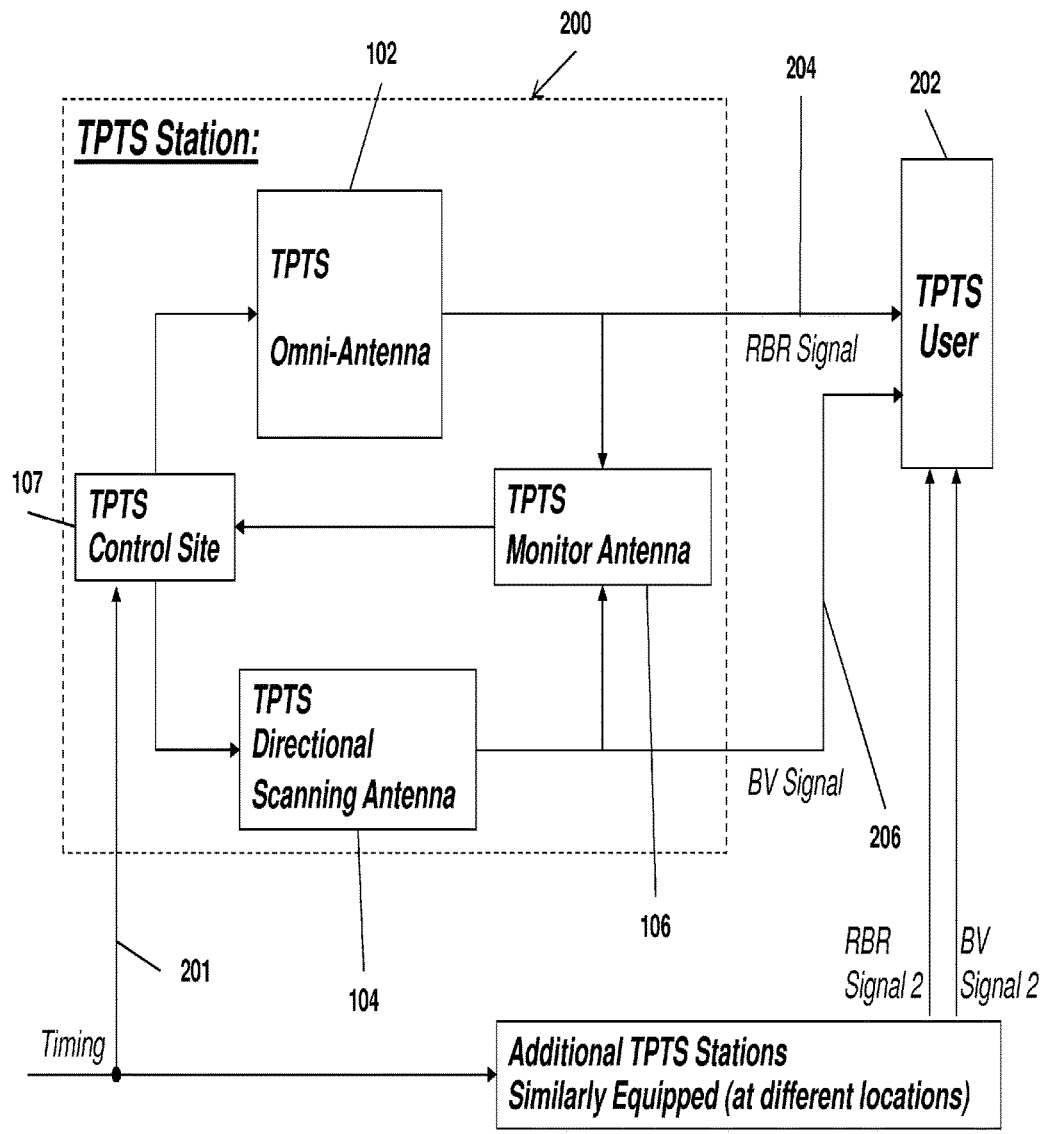
FIG. 8 is a block diagram of a forth embodiment of a TPTS Station.

FIG. 8 is a block diagram of a fourth embodiment of the TPTS. This embodiment does not have an active IR/XP mode by the TPTS user 202 or TPTS station 200, and illustrates when a TPTS user 202 may be receiving RBR 204 and BV 206 signals from more than one TPTS station. In this embodiment, the TPTS user 202 will produce correlations to the first TPTS station using the RBR signal 204 (i.e., R_RBR, 508) and the BV signal 206 (i.e., R_BV(90), 518 (if the user was at a bearing of 90 from the TPTS station), as well as, comparable measurements from another TPTS. The bearing may be produced in a similar fashion as was described above from each TPTS station by determining the difference in the correlation measurements made from the RBR signal 204 (i.e., R_RBR, 508) and the BV signal 206 (e.g., R_BV(90), 518 (if the user was at a bearing of 90 from each TPTS station). Each bearing information can be processed with the user TPTS receiver. With these four measurements the user solution can be performed. One skilled in the art would recognize that additional TPTS station, if available, may be used to enhance this user solution.

Figure 9:
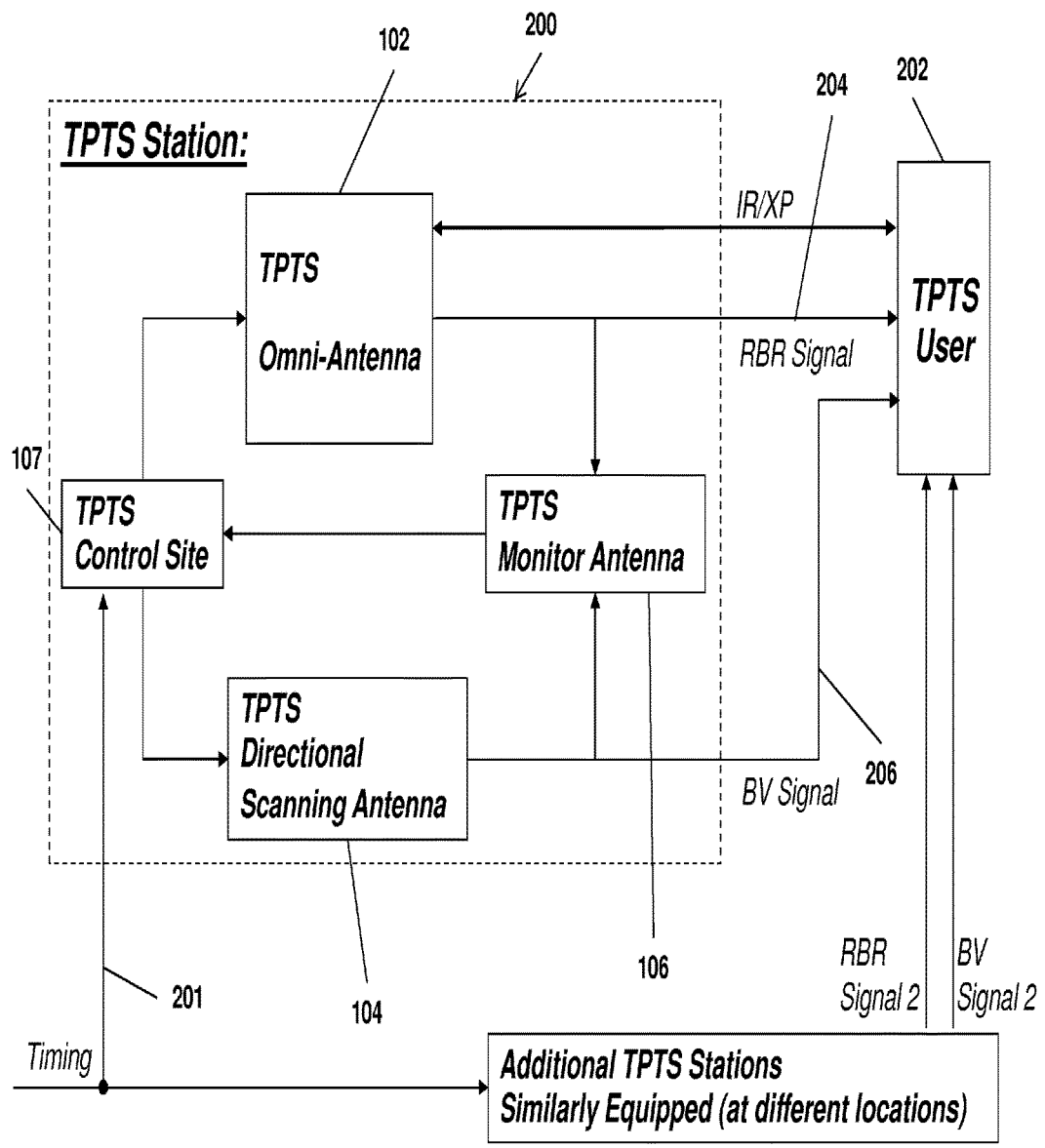
FIG. 9 is a block diagram of a fifth embodiment of a TPTS Station.

FIG. 9 is a block diagram of a fifth embodiment of the TPTS. This embodiment encompasses the functionality of FIG. 1 and illustrates that one or more TPTS stations may be used to enhance the performance of the TPTS user solution by utilizing one or more TPTS stations 200. This enhancement in performance may be gained by better (i.e., more diverse) geometry, reduction in measurement noise (gained by integration or averaging), and spatial diversity with respect to signal measurements (e.g., reduction of signal multipath).

User Solutions for the TPTS

One skilled in the art would recognize that the various embodiments of the TPTS provides varying levels of service to a TPTS user. With a single TPTS station, an active IR/XP user can determine range and bearing from a TPTS station, and with a supporting data delivery system, the user solution may include position, velocity, and time. In a TPTS embodiment that included an active IR/XP capability in the TPTS station, whereby the TPTS user has the ability to process the active IR from the TPTS station and reply (in a timely fashion) with TPTS RBR and BV measurement data, the range and bearing of the TPTS user can be determined by the TPTS station. This range and bearing information of the TPTS user can be used for position, velocity, or time determination of the TPTS user. This solution information can be sent back to the TPTS user via a communications link or utilized for other purposes such as remote tracking or E911.

For a TPTS user that does not have the ability to actively IR, bearing information can be determined by receiving the RBR 204 and BV 206 signals from at least 2 TPTS stations. The passive TPTS user may receive TPTS RBR 204 and BV 206 signals from more than one TPTS station to calculate a user solution. As one skilled in art would recognize, enhancement in performance may be gained by the utilization of multiple supporting TPTS stations to provide more diverse measurements and geometries.

Any embodiment of the present invention may include any of the optional or preferred features of the other embodiments of the present invention. The exemplary embodiments herein disclosed are not intended to be exhaustive or to unnecessarily limit the scope of the invention. The exemplary embodiments were chosen and described in order to explain the principles of the present invention so that others skilled in the art may practice the invention. Having shown and described exemplary embodiments of the present invention, those skilled in the art will realize that many variations and modifications may be made to the described invention. Many of those variations and modifications will provide the same result and fall within the spirit of the claimed invention.

What is claimed is:

1. A terrestrial positioning and timing system (TPTS) user antenna/receiver, adapted to utilize a TPTS station transmission to determine an estimate of TPTS user solution relative to a TPTS station, comprised of:
   a) a user antenna adapted to receive and process at least a TPTS transmitted spread-spectrum based range and bearing reference (RBR) signal to determine a signal correlation with respect to a TPTS reference time;
   b) a user antenna adapted to receive and process at least a TPTS transmitted spread-spectrum based bearing variable (BV) signal to determine a signal correlation with respect to a TPTS reference time; and
   c) a processor adapted to process the signal correlation information from the RBR signal and the BV signal to determine an estimate of bearing from the TPTS station.

2. The TPTS user antenna/receiver of claim 1, wherein the TPTS user antenna/receiver is adapted to actively interrogate the TPTS station to process a signal reply from the TPTS station.

3. The TPTS user antenna/receiver of claim 1 wherein the TPTS user antenna/receiver is adapted to reply to an active interrogation from the TPTS station and provide user measurement information.

4. The TPTS user antenna/receiver of claim 1, wherein a user solution further comprises at least one estimate of a range from the TPTS station, a position, a velocity of the TPTS user antenna/receiver, or a time solution.

5. The TPTS user antenna/receiver of claim 4, wherein the TPTS user antenna/receiver is adapted to receive and process data broadcast from the TPTS station to determine a user solution.

6. The TPTS user antenna/receiver of claim 1, wherein the RBR signal is adapted to be processed as a code division multiple access (CDMA) signal to determine the signal correlation.

7. The TPTS user antenna/receiver of claim 1, wherein the BV signal is adapted to be processed as a code division multiple access (CDMA) signal to determine the signal correlation.

8. The TPTS user antenna/receiver of claim 1, wherein:
   the RBR signal is adapted to be implemented using code division multiple access (CDMA);
   the BV signal is adapted to be implemented using CDMA; and
   the processor is adapted to estimate a time difference between the RBR and the BV signal correlation information to determine the estimate of bearing from the TPTS station.

9. The TPTS user antenna/receiver of claim 1, wherein the processor is adapted to process at least one of the RBR and BV signals by averaging code measurement data using carrier phase measurement data for a user solution.

10. The TPTS user antenna/receiver of claim 1, wherein the processor is adapted to process the signal correlation information using code correlation and carrier correlation measurement information such that a carrier phase is estimated for a user solution.

11. The TPTS user antenna/receiver of claim 10, wherein the carrier phase is estimated and used for a fine bearing estimation from the TPTS station.

12. The TPTS user antenna/receiver of claim 1, wherein the processor is adapted to process the signal correlation information to estimate carrier phase of at least one of the RBR and BV signals for a user solution.

13. The TPTS user antenna/receiver of claim 1, wherein the processor is adapted to estimate bearing from the TPTS station by utilizing a difference between the RBR and BV signal correlation information and a difference between RBR and BV carrier phase measurement data.

14. A terrestrial positioning and timing system (TPTS) user antenna/receiver, adapted to utilize a TPTS station transmission to determine an estimate of TPTS user solution relative to a TPTS station, comprised of:
   a) a user antenna adapted to receive and process at least a TPTS transmitted code division multiple access (CDMA) spread-spectrum based range and bearing reference (RBR) signal to determine a signal correlation with respect to a TPTS reference time;

b) a user antenna adapted to receive and process at least a TPTS transmitted CDMA spread-spectrum based bearing variable (BV) signal to determine a signal correlation with respect to a TPTS reference time; and c) a processor adapted to process the signal correlation information from the RBR signal and the BV signal to determine an estimate of bearing from the TPTS station.

15. The TPTS user antenna/receiver of claim 14, wherein the TPTS user antenna/receiver is adapted to actively interrogate the TPTS station to process a signal reply from the TPTS station.

16. The TPTS user antenna/receiver of claim 14 wherein the TPTS user antenna/receiver is adapted to reply to an active interrogation from the TPTS station and provide user measurement information.

17. The TPTS user antenna/receiver of claim 14, wherein a user solution further comprises at least one estimate of a range from the TPTS station, a position, a velocity of the TPTS user antenna/receiver, or a time solution.

18. The TPTS user antenna/receiver of claim 17, wherein the TPTS user antenna/receiver is adapted to receive and process data broadcast from the TPTS station to determine a user solution.

19. The TPTS user antenna/receiver of claim 14, wherein the processor is adapted to estimate a time difference between the RBR and the BV signal correlation information to determine the estimate of bearing from the TPTS station.

20. The TPTS user antenna/receiver of claim 14, wherein the processor is adapted to process at least one of the RBR and BV signals by averaging code measurement data using carrier phase measurement data for a user solution.

21. The TPTS user antenna/receiver of claim 14, wherein the processor is adapted to process the signal correlation information using code correlation and carrier correlation measurement information such that a carrier phase is estimated for a user solution.

22. The TPTS user antenna/receiver of claim 21, wherein the carrier phase is estimated and used for a fine bearing estimation from the TPTS station.

23. The TPTS user antenna/receiver of claim 14, wherein the processor is adapted to process the signal correlation information to estimate carrier phase of at least one of the RBR and BV signals for a user solution.

24. The TPTS user antenna/receiver of claim 14, wherein the processor is adapted to estimate bearing from the TPTS station by utilizing a difference between the RBR and BV signal correlation information and a difference between RBR and BV carrier phase measurement data.

25. A method, implemented by a terrestrial positioning and timing system (TPTS) user antenna/receiver, to utilize a TPTS station transmission to determine an estimate of TPTS user solution relative to a TPTS station, comprising the steps of:

a) receiving and processing at least a TPTS transmitted spread-spectrum based range and bearing reference (RBR) signal to determine a signal correlation with respect to a TPTS reference time;

b) receiving and processing at least a TPTS transmitted spread-spectrum based bearing variable (BV) signal to determine a signal correlation with respect to a TPTS reference time; and c) processing the signal correlation information from the RBR signal and the BV signal to determine an estimate of bearing from a TPTS station.

26. The method of claim 25, further comprising the step of actively interrogating the TPTS station to process a signal reply from the TPTS station.

27. The method of claim 25 further comprising the step of replying to an active interrogation from the TPTS station and providing user measurement information.

28. The method of claim 25, further comprising the step of producing at least one estimate of a range from the TPTS station, a position, a velocity of the TPTS user antenna/receiver, or a time solution.

29. The method of claim 28, further comprising the step of receiving and processing data broadcast from the TPTS station to determine a user solution.

30. The method claim 25, wherein the RBR signal is processed as a code division multiple access (CDMA) signal to determine the signal correlation.

31. The method of claim 25, wherein the BV signal is processed as a code division multiple access (CDMA) signal to determine the signal correlation.

32. The method of claim 25, wherein:
the RBR signal is implemented using code division multiple access (CDMA);
the BV signal is implemented using CDMA; and
a time difference between the RBR and the BV signal correlation information is used to determine the estimate of bearing from the TPTS station.

33. The method of claim 25, wherein processing of at least one of the RBR and BV signals comprises averaging code measurement data using carrier phase measurement data for a user solution.

34. The method of claim 25, wherein processing of the signal correlation information uses code correlation and carrier correlation measurement information such that a carrier phase is estimated for a user solution.

35. The method of claim 34, wherein the carrier phase is estimated and used for a fine bearing estimation from the TPTS station.

36. The method of claim 25, wherein processing of the signal correlation information comprises estimating carrier phase of at least one of the RBR and BV signals for a user solution.

37. The method of claim 25, wherein processing of the signal correlation information comprises utilizing a difference between the RBR and BV signal correlation information and a difference between RBR and BV carrier phase measurement data to estimate bearing from the TPTS station.

* * * * *